United States Patent [19]
Yoshida et al.

[11] Patent Number: 5,848,290
[45] Date of Patent: Dec. 8, 1998

[54] DATA DRIVEN INFORMATION PROCESSOR

[75] Inventors: Shinichi Yoshida; Tsuyoshi Muramatsu, both of Nara, Japan

[73] Assignee: Sharp Kabushiki Kaisha, Osaka, Japan

[21] Appl. No.: 602,422

[22] Filed: Feb. 16, 1996

[30] Foreign Application Priority Data

Mar. 9, 1995 [JP] Japan ................................. 7-049747

[51] Int. Cl.⁶ ..................................................... G06F 15/82
[52] U.S. Cl. ................................ 395/800.26; 395/800.11; 395/800.17
[58] Field of Search .................... 395/800.13, 800.17, 395/800.18, 800.2, 800.26, 800.27, 200.5, 200.56, 200.68, 200.7, 200.72, 200.83, 800.11

[56] References Cited

U.S. PATENT DOCUMENTS

| | | |
|---|---|---|
| 4,965,715 | 10/1990 | Yoshida . |
| 5,038,348 | 8/1991 | Yoda et al. . |
| 5,043,880 | 8/1991 | Yoshida . |
| 5,093,919 | 3/1992 | Yoshida et al. . |
| 5,113,339 | 5/1992 | Komatsu et al. . |
| 5,317,756 | 5/1994 | Komatsu et al. . |
| 5,323,387 | 6/1994 | Miyata et al. . |
| 5,392,405 | 2/1995 | Komatsu et al. . |
| 5,396,638 | 3/1995 | Kanekura . |
| 5,428,812 | 6/1995 | Yoshida . |
| 5,452,464 | 9/1995 | Nomura et al. . |
| 5,483,661 | 1/1996 | Yoshida et al. . |
| 5,502,720 | 3/1996 | Muramatsu . |
| 5,511,215 | 4/1996 | Terasaka et al. . |
| 5,542,079 | 7/1996 | Hatakeyama . |

FOREIGN PATENT DOCUMENTS 6162228   6/1994   Japan .

OTHER PUBLICATIONS

An Evaluation of Parallel–Processing in the Dynamic Data–Driven Processor, Hiroshi Kanekura and Souichi Miyata, Nov. 12, 1991.

*Primary Examiner*—Mark H. Rinehart

[57] ABSTRACT

In a system in which a plurality of data driven information processors are connected to each other to receive a data packet and to carry out processing simultaneously, each processor stores a processor number parameter ID of a data packet to be forcibly included in a specific data packet to be input. The forced input packet is a packet which each processor should receive and process unconditionally among packets addressed to the other processors excluding itself. The parameter ID is a number for identifying the other processors. Upon reception of an ordinary data packet, the processor compares information for specifying a processor to process the received ordinary data packet respectively with parameter ID and processor identification number PE# preassigned to each processor for identifying itself, and in response to matching between the information and any one of parameter ID and processor identification number PE#, takes in the received ordinary data packet in order to process the same. As a result, each processor can process not only a data packet to be processed in itself but also a data packet to be processed in the other processors, and a data transmission path among the processors can be set changeably according to the set parameter ID.

110 Claims, 10 Drawing Sheets

RM : BRANCH COMPARISON
    MASK PARAMETER

RD : BRANCH COMPARISON
    DATA PARAMETER

DATA DRIVEN INFORMATION PROCESSOR

BACKGROUND OF THE INVENTION

1. Field of the Invention

The present invention relates to data driven information processors, and more particularly, to a data driven information processor easily enabling a free connection among a plurality of processors connected to each other to carry out processing, by not fixing a data path.

2. Description of the Related Art

A data driven information processor (hereinafter referred to as a "data driven processor") proceeds processing in parallel according to a simple rule of "when all the data needed for an action are available, and resources such as an operation unit required for the action are assigned thereto, the action is carried out."

FIG. 6 is a block configuration diagram of a data driven information processing system for conventional video signal processing. A system configuration example similar to that of FIG. 6 is shown in "An Evaluation of Parallel-Processing in the Dynamic Data Driven-Processor" (published in Microcomputer Architecture Symposium sponsored by Information Processing Society of Japan (Nov. 12, 1991)).

The system shown in FIG. 6 includes a data driven processor 1 and an image memory unit 11. Image memory unit 11 includes a memory interface 2 and an image memory 3. A data driven processor 1 includes input ports IA, IB, and IV, and further includes output ports OA, OB, and OV.

A video signal to be processed is applied to input ports IA and IB through transmission paths 7 and 8 connected thereto, respectively. Input port IV to which a transmission path 5 is connected receives an access result of image memory 3 in image memory unit 11. Output ports OA and OB send out data on a processing result in the system through transmission paths 9 and 10 connected thereto, respectively. Output port OV sends out data for accessing image memory unit 11 through a transmission path 4 connected thereto. Memory interface 2 and image memory 3 are connected via a memory access control line 6. Note that data transmitted through transmission paths 4, 5 and 7 to 10 is in a form of a data packet.

FIG. 7 is a field configuration diagram of a data packet which is applied to embodiments according to the conventional system and the present invention. The data packet includes an instruction code C indicating the content of processing in processor 1, a processor number Pe# for specifying uniquely a data driven processor in the system to process the data packet, a node number N for specifying uniquely an instruction to be executed in the processor using the data packet, a generation number G which is an identifier assigned to the data packet in accordance with an input time series order when it is input to processor 1 through data transmission path 7 or 8 of FIG. 6, which is used in matching of data in processor 1, and which serves as an address to access image memory 3 for memory interface 2, and data D.

Returning to FIG. 6, an input packet having generation number G assigned in accordance with an input order is applied to processor 1 via input port IA or IB in a time series manner. A data flow program for video processing is prestored in processor 1. Processor 1 processes the content of the applied data packet based on the program, and sends out a data packet storing the processing result via any one of output ports OA and OB. The data packet sent out to image memory unit 11 via output port OV of processor 1 stores an access request for image memory 3, such as a request to reference/update or the like of data stored in image memory 3. Upon reception of the access request, memory interface 2 accesses image memory 3 through memory access control line 6. After that, memory interface 2 applies a data packet storing the result data to input port IV of processor 1 through transmission path 5. Processor 1 receives the data packet applied via input port IV, and continues the processing based on the program.

FIG. 8 is a block configuration diagram of conventional video processing data driven processor 1. Referring to FIG. 8, processor 1 includes an input processing unit 17 to input stage of which input ports IA and IB are connected, a junction unit 12, a main processing unit 13 for carrying out processing based on a prestored data flow program, a branch unit 14, an output processing unit 15, to output stage of which output ports OA and OB are connected, for carrying out output operation according to the content of a branch control parameter register group 18, and a PE# register 16 for storing a processor identification number PE# for identifying uniquely processor 1 including itself in a networking system. Branch control parameter register group 18 includes a branch comparison mask parameter register 181 for storing a branch comparison mask parameter RM, and a branch comparison data parameter register 182 for storing a branch comparison data parameter RD.

FIG. 9 is a block configuration diagram of input processing unit 17 in conventional vide processing data driven processor 1. Referring to FIG. 9, input processing unit 17 includes an input junction unit 170, a comparing unit 171 referencing the content of PE# register 16, and an output port selecting unit 172. Input junction unit 170 receives a data packet applied via ports Ia and Ib connected to input ports IA and IB of processor 1 to send out the same to comparing unit 171 and output port selecting unit 172 sequentially. Comparing unit 171 compares processor number Pe# in the applied data packet and processor identification number PE# prestored in PE# register 16. If they match, comparing unit 171 determines the applied data packet as a data packet addressed to processor 1 including itself, and sends out the determination result information to output port selecting unit 172 as a data value 0, for example. Upon reception of the determination result information, for example, data value 0, output port selecting unit 172 sends out the applied data packet to junction unit 12 through port Oa. If they do not match, comparing unit 171 determines the applied data packet as a data packet addressed to the other processors, and sends out the determination result information to output port selecting unit 172 as a data value 1, for example. Upon reception of the determination result information, for example, data value 1, output port selecting unit 172 sends out the applied data packet to output processing unit 15 through port Ob.

Returning to FIG. 8, junction unit 12 receives the applied data packet to send out the same to main processing unit 13.

Main processing unit 13 receives the applied data packet, and processes the data packet according to the prestored data flow program. If access processing to image memory 3 occurs, main processing unit 13 sends out the data packet to image memory unit 11 via output port OV, and after image memory 3 is accessed using the data packet, main processing unit 13 receives the data packet via input port IV.

Branch unit 14 receives the data packet output from main processing unit 13. Branch unit 14 compares processor number Pe# of the applied data packet and processor identification number PE# of PE# register 16, similarly to input processing unit 17. If they match, branch unit 14 sends out the applied data packet to junction unit 12, and if they do not match, branch unit 14 sends out the applied data packet to output processing unit 15.

Output processing unit 15 receives the applied data packet, and references processor number Pe# or generation number G in the applied data packet. According to the branch condition preset by branch comparison mask parameter RM and branch comparison data parameter RD in branch control parameter register group 18, output processing unit 15 sends out the applied data packet to any one of output ports OA and OB.

As described above, processing may be repeated sequentially in a loop of junction unit 12→main processing unit 13→branch unit 14 formed in processor 1. When processing of a data packet is completed in main processing unit 13, processor number Pe# in the data packet is updated according to the program.

In a data flow processor disclosed in Japanese Patent Laying-Open No. 6-162228, three kinds of parameters are prepared as a branch control parameter: an ID parameter; a branch comparison data parameter; and a branch comparison mask parameter. The ID parameter is equivalent to the content of PE# register 16 of FIG. 8, and the branch comparison data parameter and the branch comparison mask parameter are equivalent to branch comparison data parameter RD and branch comparison mask parameter RM in branch control parameter register group 18 of FIG. 8. According to the technique disclosed in Japanese Patent Laying-Open No. 6-162228, the branch condition of output processing unit 15 is given by the following expression (1):

(RM.and.Pe#).exor.(RM.and.RD)                (1)

Note that parameters RM and RD in the expression (1) are values stored in branch comparison mask parameter register 181 and branch comparison data parameter register 182, respectively. Pe# in the expression (1) is a processor number in the applied data packet to output processing unit 15. Further, operators "and" and "exor" in the expression (1) indicate a logical product for every bit and an exclusive OR for every bit, respectively.

When the result of the expression (1) is 0, that is, when values of operands (RM.and.Pe#) and (RM.and.RD) for an exor operation match, the applied data packet to output processing unit 15 is output to output port OA. When the result of the expression (1) is not 0, that is, when the values of operands (RM.and.Pe#) and (RM.and.RD) for the exor operation do not match, the applied data packet to output processing unit 15 is sent out to output port OB.

FIG. 10 shows a first configuration of a system in which four conventional video processing data driven processors 1 are used. To four processors 1 in the system of FIG. 10, processor identification numbers PE#0, PE#1, PE#2, and PE#3 for uniquely identifying respective processors are assigned, respectively. These identification numbers 0 to 3 are stored in PE# registers 16 in respective processors 1. In the following description, each processor is specified using the identification number assigned to each processor 1.

In the system of FIG. 10, a network is established so that a data packet may be applied from any processor to another arbitrary processor. For example, in order to apply a data packet from processor PE#0 to processor PE#1, a data packet whose processor number Pe# in FIG. 7 is set to the identification number (1) of processor PE#1 is output from output port OA of processor PE#0. The data packet is once applied to input port IA of processor PE#3. After that, the data packet is output from output port OA of processor PE#3 and applied to input port IA of processor PE#1.

In order to configure such a network, the content of branch control parameter register group 18 of each processor may be set as shown in parameters RM and RD of FIG. 10, for example, based on the above described expression (1). More specifically, under the output branch condition of processor PE#0, if the lowermost bit of processor number Pe# in a data packet is 1, the data packet is sent out to output port OA, and otherwise to output port OB. Under the output branch condition of processor PE#1, if the lowermost bit of processor number Pe# in a data packet is 0, the data packet is sent out to output port OA, and otherwise to output port OB. Further, under the output branch conditions of processors PE#2 and PE#3, if processor number Pe# in a data packet is any of 0 to 3, the data packet is sent out to output port OA, and otherwise to output port OB.

FIGS. 11A and 11B are field configuration diagrams of a data packet for initialization applied to the embodiments according to the conventional system and the present invention. FIG. 11A shows an initialization packet for PE# register 16, and FIG. 11B shows an initialization packet for branch control parameter register group 18.

The initialization packets of FIGS. 11A and 11B each store instruction code C of 8-bit length and processor number Pe# of 9-bit length. In addition, the initialization packet of FIG. 11B stores branch comparison mask parameter RM of 9-bit length and branch comparison data parameter RD of 9-bit length.

Description will now be given of setting of the content of a register using these initialization packets. Assume that the content of each register in the system is initialized to 0 beforehand. In response to the first input of a packet of FIG. 11A after resetting, each processor processes the packet as a packet addressed to itself, and sets the value of processor number Pe# in the packet in corresponding register 16. After that, the packet is not output but erased. In response to the next input of a packet of FIG. 11B, each processor compares processor number Pe# of the packet with the content of register 16. If they match, each processor sets parameters RM and RD in the packet in registers 181 and 182. After that, the packet is not output but erased. If they do not match, the packet is directly output.

The content of each register of each processor is thus initialized. Note that, in response to another input of a packet of FIG. 11B to each processor, the contents of registers 181 and 182 are reset (overwritten) according to the content of the packet.

FIG. 12 shows a second configuration of the system in which four conventional video processing data driven processors 1 are used. In the case of FIG. 12, by parallel connection of processors PE#2 and PE#3 to output port OA of processor PE#0 by wiring, the output of output port OA is copied to be applied to input ports IA of processors PE#2 and PE#3. In this case, the content of branch control parameter register group 18 of each processor is considered to be set as shown in parameters RM and RD of FIG. 12, for example. More specifically, under the output branch condition of processor PE#0, settings are made so that a data packet is sent out to output port OA if the value of processor number Pe# therein is 2 or 3, and to output port OB otherwise. Under respective output branch conditions of processors PE#1, PE#2, and PE#3, settings are made so that data packet is sent out to output port OA if the value of processor number Pe# therein is an even number, and to output port OB otherwise.

However, it is impossible to copy a data packet to be output from output port OA of processor PE#0 to apply the data packet to both processors PE#2 and PE#3 to be separately processed in the processors by simply combining the above branch condition setting and the function of conventional input processing unit 17. If processor number Pe# of a data packet to be output from output port OA of processor PE#0 is 2, the data packet applied to processor PE#2 is determined as a data packet addressed to processor PE#2 itself by input processing unit 17 in processor PE#2, and processed in main processing unit 13. On the other hand, although a copy of the data packet, output from output port OA of processor PE#0, whose processor number Pe# is 2 is also applied to processor PE#3, the copy is not determined as a data packet addressed to processor PE#3 itself by input processing unit 17 in processor PE#3. The data packet is directly output from output port OA without being processed in processor PE#3.

As described above, when a data packet is copied in a hardware manner among processors as shown in FIG. 12, such a structure cannot be established in which copied data packets are all processed in all their target processors by simply combining the function of input processing unit 17 and the branch condition setting in the conventional system. More specifically, even in a two-branch configuration to simultaneously process two packets obtained by copying as shown in FIG. 12, only one packet can substantially be processed. This is caused by fixation of a data transmission path among the processors.

SUMMARY OF THE INVENTION

One object of the present invention is to provide a data driven information processor enabling, when a plurality of data driven information processors are connected to each other to receive a data packet and to carry out processing simultaneously, a free connection among the processors by a changeable data transmission path among the processors.

Another object of the present invention is to provide a data driven information processor capable of setting and changing easily a connection manner by a data transmission path among processors.

In order to achieve the above described objects, a data driven information processor according to the present invention includes, when a plurality of data driven information processors are connected to each other to receive a data packet and to carry out processing simultaneously, a plurality of data packet receiving ports, a specifying information storing unit for storing one or more specifying information items, included in a specifying data packet received from any of the data packet receiving ports, for specifying a predetermined processor among the plurality of data driven information processors, and a receiving unit for comparing designating information for designating a processor to process an ordinary data packet received from any of the data packet receiving ports respectively with the one or more specifying information items stored in the specifying information storing unit and identifying information assigned to each processor in advance to identify itself, taking in the received ordinary data packet to process the same inside in response to matching of comparison between any one of the one or more specifying information items and the identifying information, and the designating information, and sending the received ordinary data packet outside in response to mismatching of comparison between all of the one or more specifying information items and the identifying information, and the designating information.

By being thus structured, the data driven information processor according to the present invention can receive and process not only a data packet to be processed in the processor itself, that is, a data packet whose designating information matches the identifying information, but also data packet to be processed in the other processors, that is, a data packet whose designating information matches any of the one or more specifying information items stored in the specifying information storing unit. As a result, a flexible connection among the data driven information processors through a data transmission path can be implemented.

In the data driven information processor according to the present invention, the specifying information stored in the specifying information storing unit is updated according to reception of the specifying data packet. As a result, the above described connection manner among the processors can be set and changed with ease.

The data driven information processor according to the present invention further includes a plurality of data packet output ports for outputting the ordinary data packet and the specifying data packet outside the processor. The receiving ports of the plurality of data driven information processors can be connected to the data packet output ports. As a result, a data packet output from a data driven information processor can be applied to a plurality of different data driven information processors simultaneously to be processed. Respective data packets obtained by copying at an output stage of a data driven information processor can be processed in a plurality of different information processors at the next stage simultaneously.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described hereinafter in detail with reference to the drawings. A data driven processor (data driven information processor) of the following embodiments includes an improvement in input processing unit 17 of conventional processor 1. Other than that, the processor of the following embodiments is similar to the conventional processor in configuration. Therefore, description will be given here of the improved input processing unit.

Figure 1A:
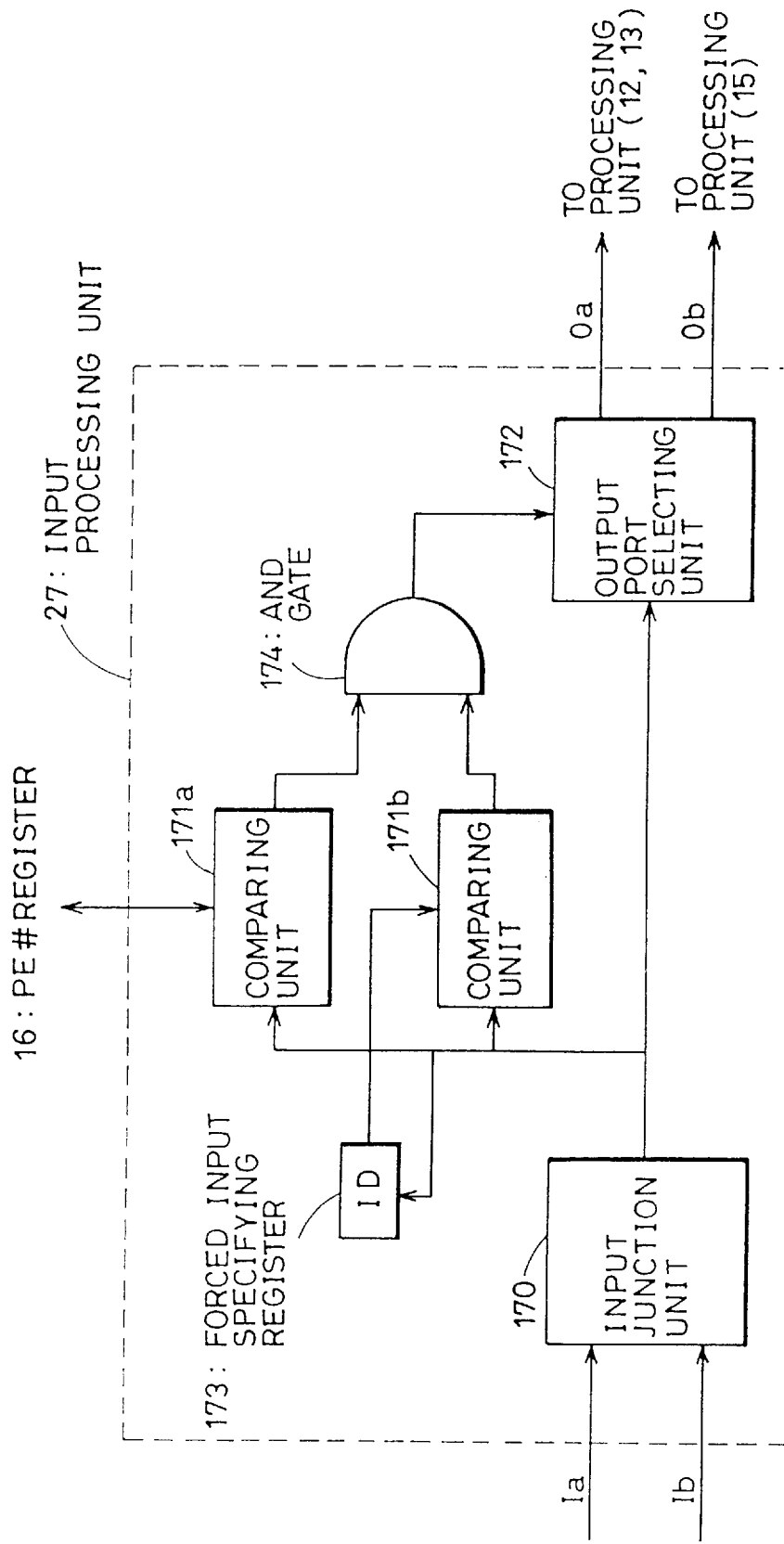
FIGS. 1A and 1B are diagrams showing first and second configurations of an input processing unit of a data driven processor according to one embodiment of the present invention.
Figure 8:
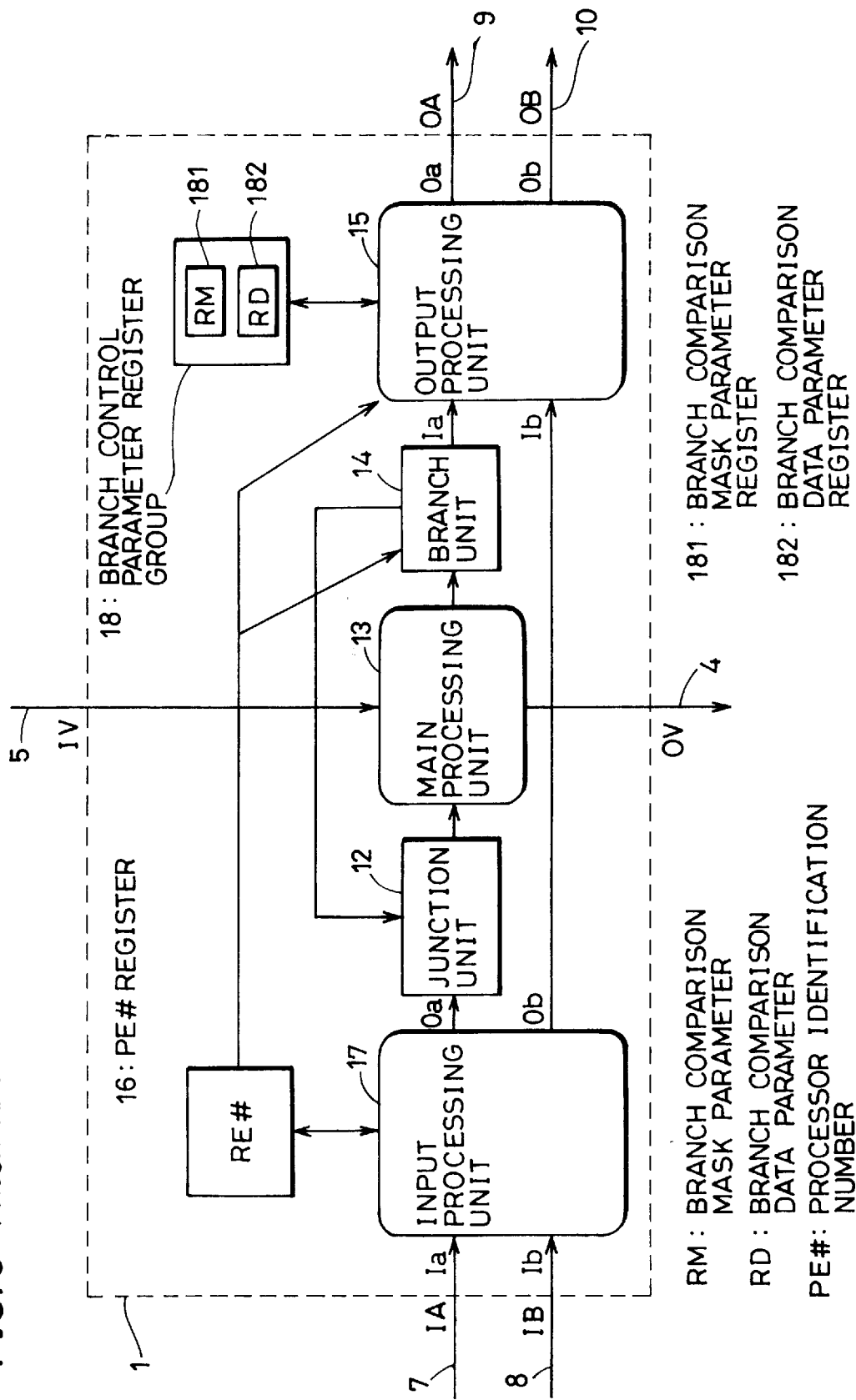
FIG. 8 is a block configuration diagram of a conventional video processing data driven processor.
Figure 9:
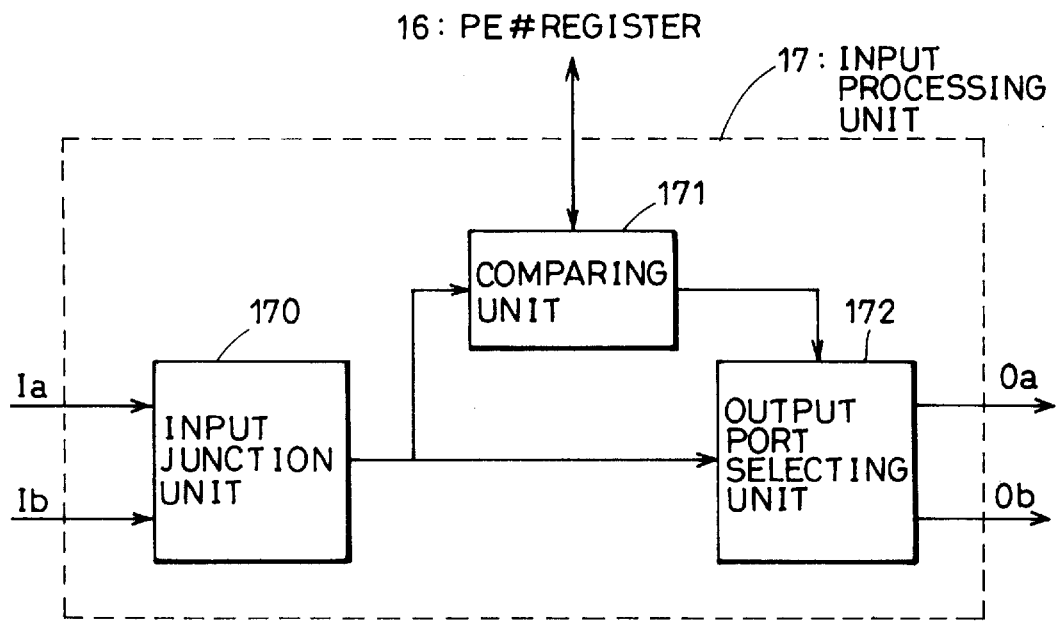
FIG. 9 is a block configuration diagram of an input processing unit of the conventional video processing data driven processor.

Referring to FIG. 1A, an input processing unit 27 includes an input junction unit 170 to which input ports Ia and Ib are connected, comparing units 171a and 171b, a forced input specifying register 173, an AND gate 174, and an output port selecting unit 172 connected to junction unit 12 and main processing unit 13 of FIG. 8 through output port Oa and connected to output processing unit 15 of FIG. 8 through output port Ob.

A processor number parameter ID of a forced input packet is stored in forced input specifying register 173. The forced input packet is a packet which each processor should receive and process unconditionally among packets addressed to the other processors excluding itself. Parameter ID is a parameter indicating a processor number other than one assigned to itself. In response to reception of a data packet which stores parameter ID as processor number Pe#, each processor takes in the data packet forcedly (unconditionally). Comparing unit 171a connects and refers to PE# register 16. Comparing unit 171b connects and refers to forced input specifying register 173. Comparing units 171a and 171b simultaneously compare processor number Pe# in a data packet applied through input junction unit 170 respectively with the content of PE# register 16 and the content of forced input specifying register 173. If they match, each comparing unit determines the data packet as a data packet addressed to its processor, and outputs the determination result information to AND gate 174 as a data value 0, for example. On the other hand, if they do not match, each comparing unit determines the data packet as a data packet addressed to the other processors, and outputs the determination result information to AND gate 174 as a data value 1, for example. After a logical product of the matching/mismatching information (data value 0/1) output from each comparing unit is taken by AND gate 174, the result value is applied to output port selecting unit 172. When output port selecting unit 172 receives the data value 0, for example, as the matching/mismatching information, output port selecting unit 172 sends out the data packet applied through input junction unit 170 to main processing unit 13 from output port Ob through junction unit 12. When output port selecting unit 172 receives the data value 1, for example, as the matching/mismatching information, it sends out the packet outside the processor from output port Ob through output processing unit 15.

As described above, in input processing unit 27 of FIG. 1A, in response to matching of processor number Pe# in an applied data packet with at least any one of the content of PE# register 16 and the content of forced input specifying register 173, the data packet is applied to main processing unit 13 as a data packet addressed to a processor including input processing unit 27.

Figure 1B:
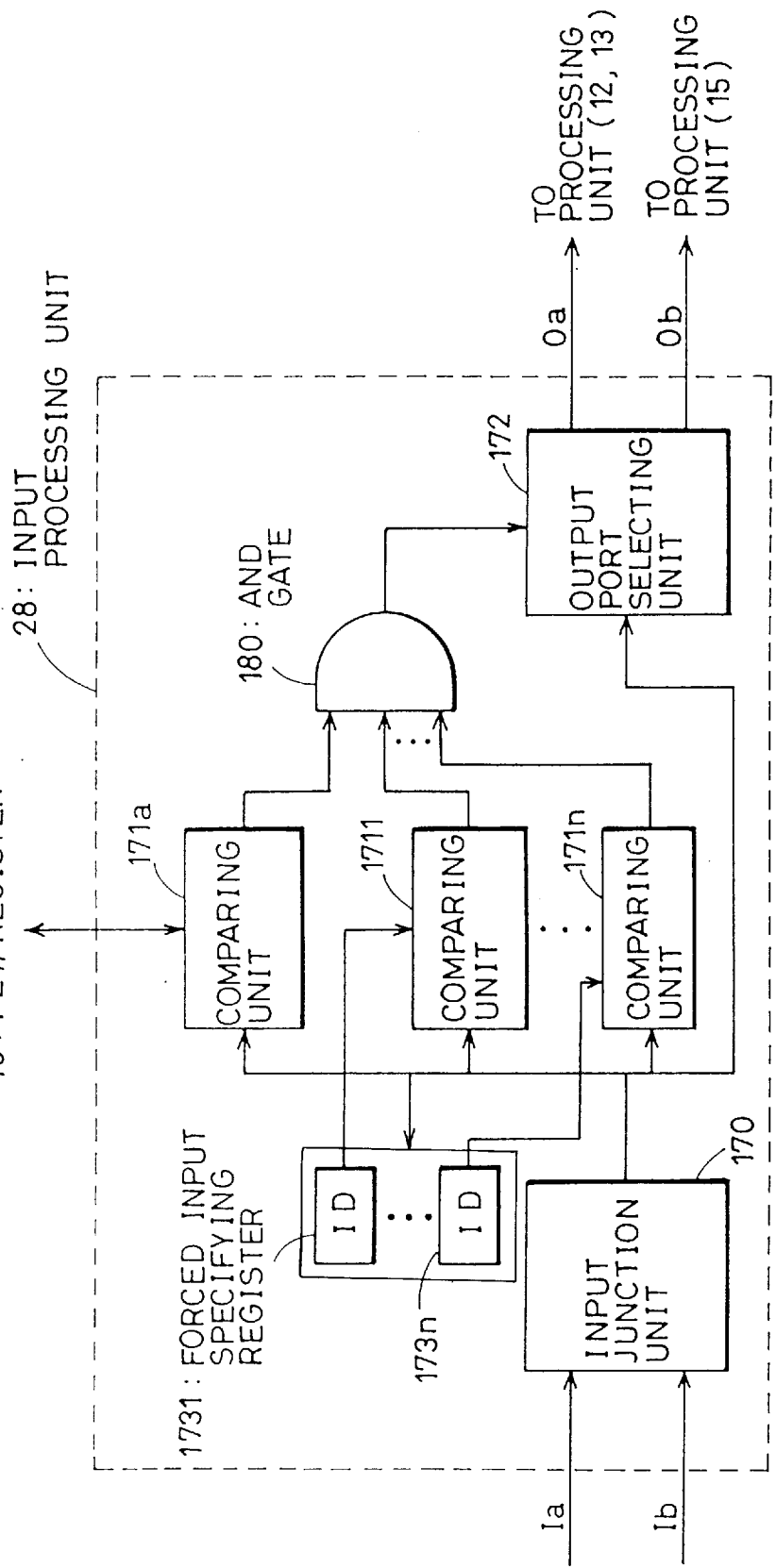

Only one processor number Pe# in a forced input data packet can be specified in input processing unit 27. However, when it is desired to specify a plurality of kinds of parameters ID, a plurality of forced input specifying registers 173 and a plurality of comparing units 171b may be prepared as shown in FIG. 1B, and an AND gate having three or more inputs may be prepared as AND gate 174 accordingly.

Figure 2:
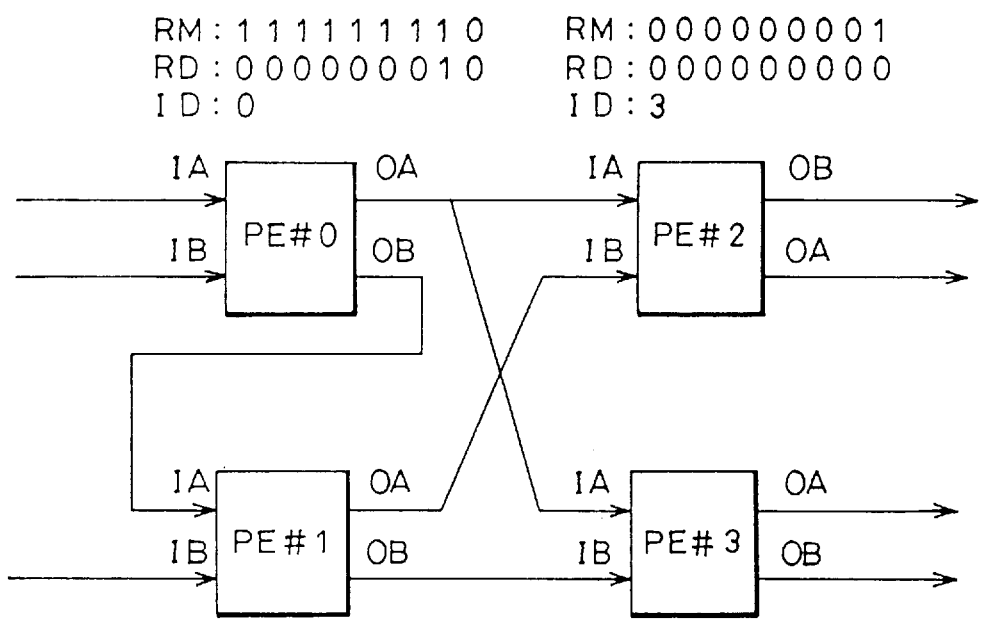
FIG. 2 is a system configuration diagram in the case where a system of FIG. 12 is reconfigured with a processor including te input processing unit shown in FIG. 1.

Referring to FIG. 2, since processors PE#0 and PE#1 do not require forced input of a data packet, the contents (ID in FIG. 2) of forced input specifying registers are set to their own processor identification numbers, respectively. In this case, processors PE#0 and PE#1 receive and process only a data packet having processor number Pe# addressed to themselves. On the other hand, since processor PE#2 is required to receive and process not only a data packet addressed to itself but also a data packet addressed to processor PE#3, 3 is set as the content of the forced input specifying register. Similarly, since processor PE#3 is required to receive and process not only a data packet addressed to itself but also a data packet addressed to processor PE#2, 2 is set as the content of the forced input specifying register.

Figure 3:
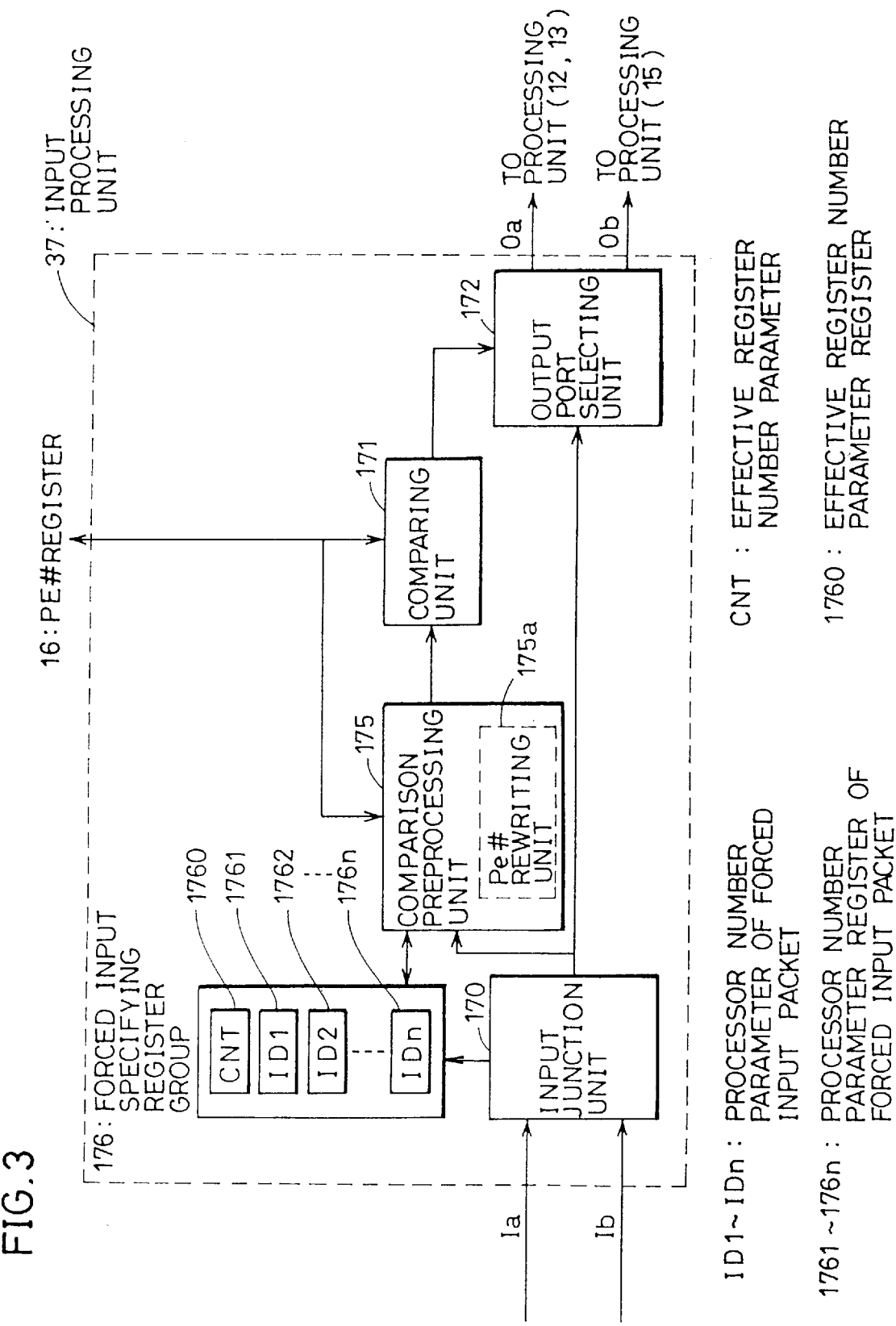
FIG. 3 is a diagram showing a configuration of an input processing unit of a data driven processor according to another embodiment of the present invention.

Referring to FIG. 3, an input processing unit 37 includes input junction unit 170, comparing unit 171, a comparison preprocessing unit 175 including a Pe# rewriting unit 175a, a forced input specifying register group 176, and output port selecting unit 172.

In forced input specifying register group 176, n processor numbers other than a processor number identifying a processor including forced input specifying register group 176 are stored in n processor number parameter registers 1761 to 176n of forced input packets as processor number parameters ID1 to IDn. An effective register number parameter CNT indicating the number of registers whose contents are made effective among registers 1761 to 176n is stored in an effective register number parameter register 1760. When the value of parameter CNT is 3, for example, the contents of three registers 1761 to 1763 are effective.

Comparison preprocessing unit 175 references processor number Pe# in a data packet applied from input junction unit 170 and the content of forced input specifying register group 176, and compares the contents of the effective registers specified by parameter CNT of register 1760 with processor number Pe# in the applied data packet to determine whether or not there is a matching between them. If there is a matching, the applied data packet is output to comparing unit 171 after having processor number PE# rewritten by Pe# rewriting unit 175a to the processor number of a processor including comparison preprocessing unit 175, that is, the referenced content of PE# register 16. If there is no matching, the applied data packet is directly output to comparing unit 171.

Similarly to the conventional case, comparing unit 171 compares processor number Pe# in the applied data packet output from comparing preprocessing unit 175 with the content of PE# register 16. If they match, comparing unit 171 determines the applied data packet as a data packet addressed to a processor including comparing unit 171, and applies the determination result information to output port selecting unit 172 as the data value 0, for example. Output port selecting unit 172 receives the determination result information, that is, the data value 0, for example, and sends out the applied data packet to main processing unit 13 from output port Oa through junction unit 12. If they do not match, comparing unit 171 determines the applied data packet as a data packet addressed to the other processors, and applies the determination result information to output port selecting unit 172 as the data value 1, for example. Output port selecting unit 172 receives the determination result information such as the data value 1, and accordingly sends the applied data packet outside from output port Ob through output processing unit 15.

Figure 4:
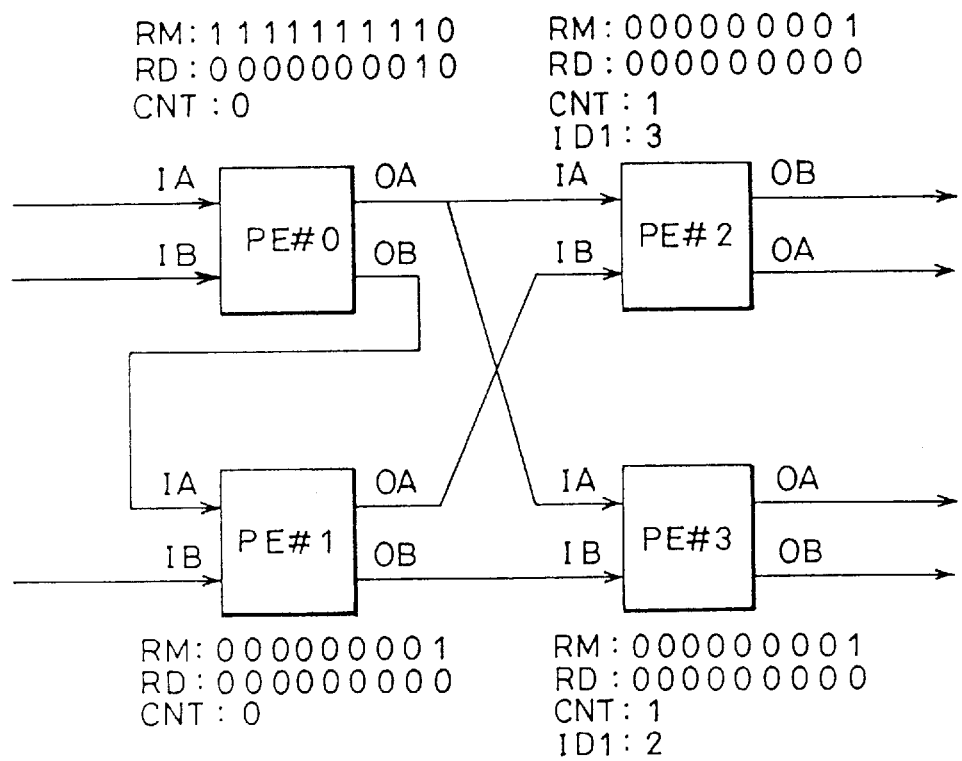
FIG. 4 is a system configuration diagram in the case where the system of FIG. 12 is reconfigured with a processor including the input processing unit shown in FIG. 3.

Referring to FIG. 4, since processors PE#0 and PE#1 do not require forced input of a data packet, 0 is set as parameter CNT of forced input specifying register group 176. In this system configuration, processors PE#0 and PE#1 receive and process only a data packet having a processor number addressed to themselves.

On the other hand, since processor PE#2 is required to receive and process not only a data packet addressed to itself but also a data packet addressed to processor PE#3, 1 and 3 are set as parameters CNT and ID1 of forced input specifying register group 176, respectively. Similarly, since processor PE#3 is required to receive and process not only a data packet addressed to itself but also a data packet addressed to processor PE#2, 1 and 2 are set as parameters CNT and ID1 of forced input specifying register group 176, respectively.

Figure 5A:
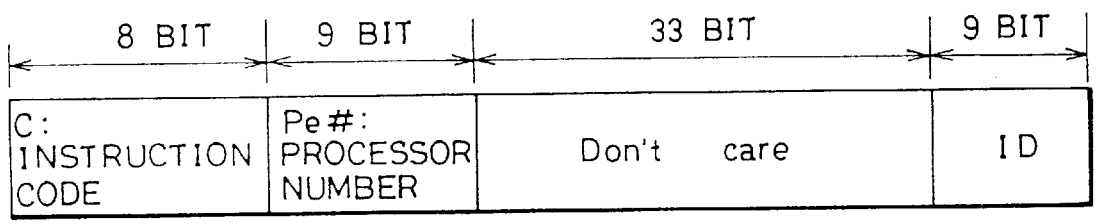
FIGS. 5A and 5 are field configuration diagrams of a data packet for initialization applied to the embodiments of the present invention.
Figure 5B:
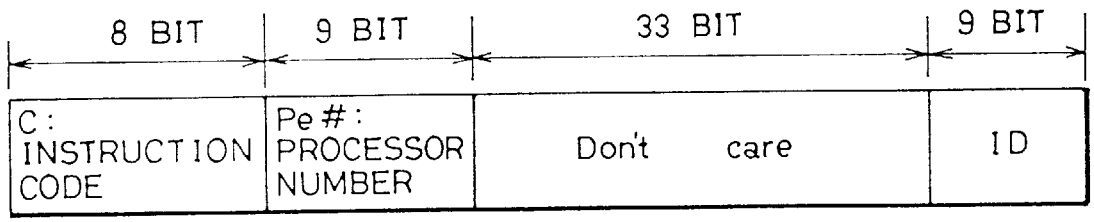
Figure 6:
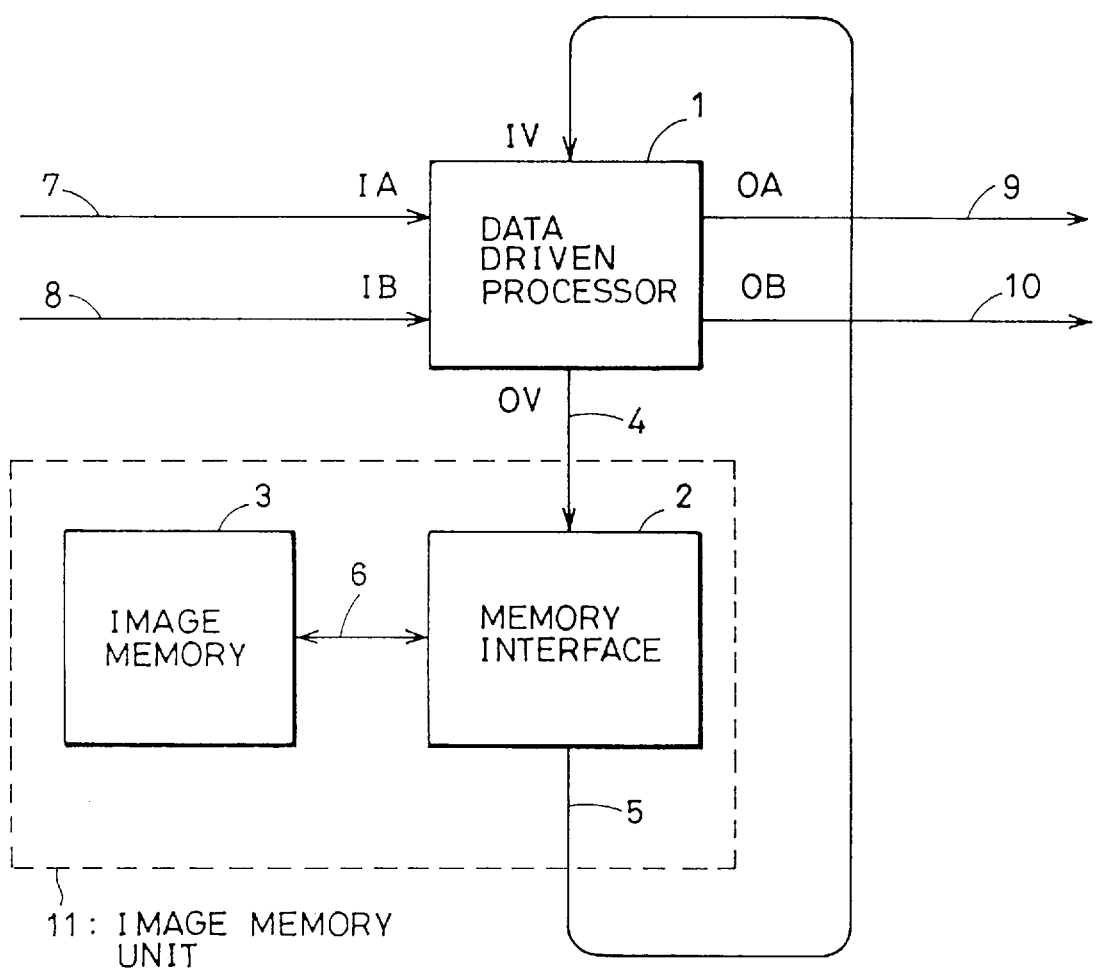
FIG. 6 is a block configuration diagram of a data driven information processing system for conventional video signal processing.
Figure 7:
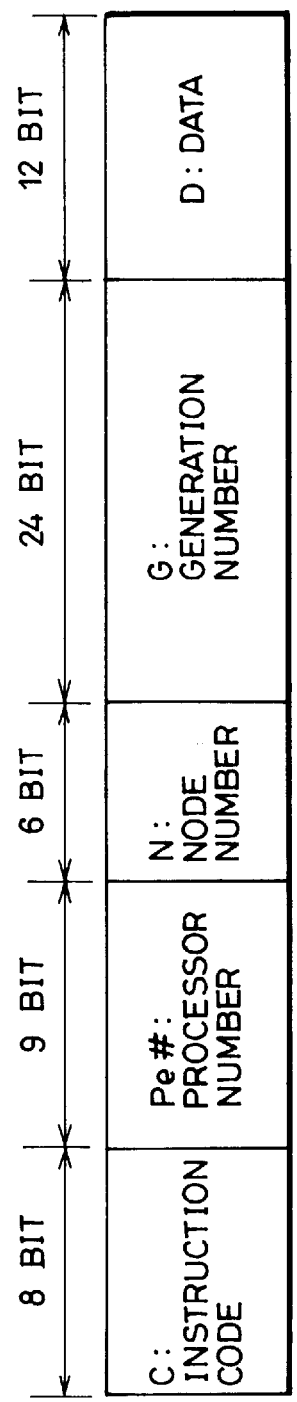
FIG. 7 is a field configuration diagram of a data packet applied to the embodiments according to the conventional system and the present invention.

FIG. 5A shows an initialization packet for forced input specifying register 173, and FIG. 5B shows an initialization packet for forced input specifying register group 176. The initialization packets of FIGS. 5A and 5B each store instruction code C of 8-bit length, processor number Pe# of 9-bit length, and processor number parameter ID of 9-bit length of a forced input packet. Processor numbers Pe# of FIGS. 5A and 5B each specify a processor to which corresponding parameter ID should be set.

Initialization of register 173 and register group 176 using these initialization packets will now be described. Since initialization of register 16 and branch control parameter register group 18 is the same as that of the conventional case, the description thereof will not be repeated. It is assumed that 0 is set as the contents of register 173 and register group 176 immediately after resetting.

When each processor receives a data packet of FIG. 5A addressed to itself at the input junction unit 170, each processor sets parameter ID of the received data packet in register 173. When each processor again receives the packet of FIG. 5A at the input junction unit 170, the content of register 173 is reset (overwritten). This packet is erased after data setting.

When each processor receives a data packet of FIG. 5B addressed to itself at the input junction unit 170, each processor references effective register number parameter CNT of register 1760 to set parameter ID of the received initialization packet in the (CNT+1)-th register among registers 1761 to 176n. Then, parameter CNT of register 1760 is incremented by 1. When each processor again receives the packet of FIG. 5B, similar processing is repeated. As a result, parameters ID are set in order from register 1761 to register 176n, and parameter CNT of register 1760 indicates the number of effective parameter registers (whose parameter IDs have already been set). After the setting, the packet is erased. As described above, after data setting by the packets of FIGS. 5A and 5B, these packets are erased, whereby unnecessary packet circulation on a transmission path is avoided, and an appropriate transmission efficiency can be maintained.

Figure 10:
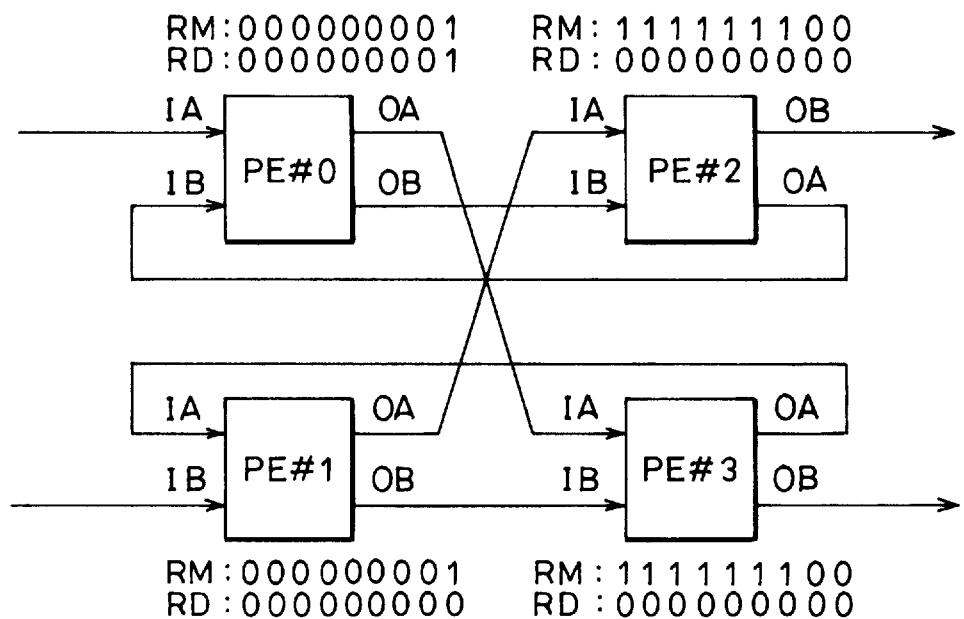
FIG. 10 is a diagram showing a first configuration of a system in which four conventional video processing data driven processors are used.
Figure 11A:
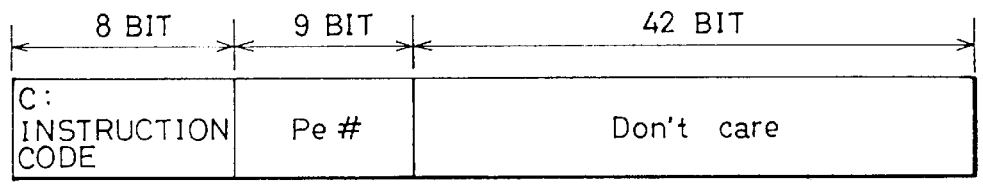
FIGS. 11A and 11B are field configuration diagrams of a data packet for initialization applied to the embodiments according to the conventional system and the present invention.
Figure 11B:
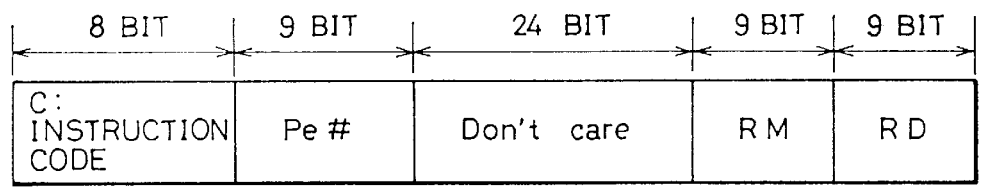
Figure 12:
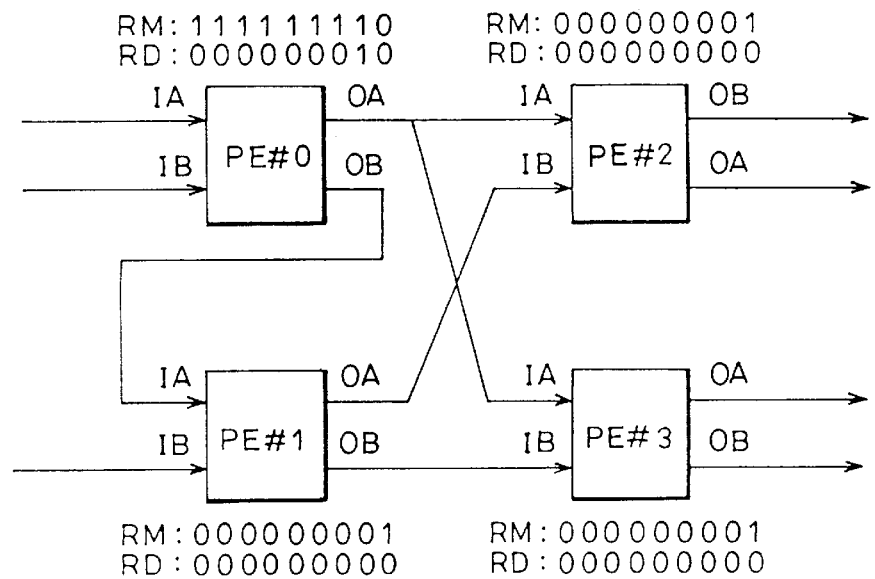
FIG. 12 is a diagram showing a second configuration of the system in which four conventional video processing data driven processors are used.

In the above embodiments, even when a two-branch configuration is employed in order to simultaneously process two packets copied as shown in FIG. 10, these two packets can be processed simultaneously in two different processors at the next stage without provision of a special circuit between processors for rewriting processor number Pe# of a packet. Therefore, complication of wiring among processors and complication of the system configuration caused by provision of such a special circuit can be avoided.

As described above, by providing the above described input processing unit in each processor, each processor can receive and process not only a data packet to be processed in itself but also a data packet to be processed in the other processors. As a result, when a plurality of processors are connected to each other to receive a data packet and to process the same simultaneously, a data path connecting the processors to each other can be changed, and a flexible connection among the processors can be implemented.

Further, by using the initialization packet, a connection state by the above described data path among the processors can be set and changed with ease.

Input ports of the plurality of processors can be connected to respective data packet output ports of each processor. As a result, a data packet output from a processor at the previous stage can be applied to a plurality of different processors at the next stage for simultaneous processing, whereby respective data packets obtained by copying at the output stage of a processor can simultaneously be processed by a plurality of different processors at the next stage.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data driven processor to be interconnected with a plurality of data driven information processors to receive a data packet and to carry out-processing simultaneously, the data driven information processor comprising:

a plurality of receiving ports each for receiving a data packet from outside the data driven processor;

specifying information storing means for storing one or more specifying information items, included in a specifying data packet received from any of said receiving ports, said specifying information items specifying a predetermined processor among said plurality of data driven information processors; and receiving means for comparing designating information designating a processor included in an ordinary data packet received from any of said receiving ports respectively with said one or more specifying information items stored in said specifying information storing means and with identifying information assigned to each processor in advance to identify itself, for delivering the ordinary data packet to a processing portion of the data driven information processor in response to the comparing indicating a match between at least one of any one of said one or more specifying information items and said identifying information, and said designating information, and for sending the received ordinary data packet outside the data driven information processor in response to the comparing indicating mismatching between all of said one or more specifying information items and said identifying information, and said designating information.

2. The data driven information processor according to claim 1, wherein in response to mismatching match between said specifying information of said specifying data packet received from any of said receiving ports and said identifying information, the received specifying data packet is sent outside the data driven information processor.

3. The data driven information processor according to claim 2, wherein said receiving means includes comparing and determining means for simultaneously comparing said designating information of said ordinary data packet received from any of said receiving ports respectively with said one or more specifying information items stored in said specifying information storing means and with said identifying information, and for determining whether or not said designating information matches any of said one or more specifying information items and said identifying information.

4. The data driven information processor according to claim 3, wherein said comparing and determining means includes first and second comparing means for simultaneously receiving said ordinary data packet received from any of said receiving ports, said first comparing means, responsive to reception of said received ordinary data packet, for comparing said designating information of the received ordinary data packet and each of said one or more specifying information items stored in said specifying information storing means outputting a first comparison result, and said second comparing means, responsive to reception of said received ordinary data packet, for comparing said designating information of the received ordinary data packet and said identifying information and outputting a second comparison result; and determining means for carrying out said determination based on said first and second comparison results output from said first and second comparing means.

5. The data driven information processor according to claim 2, wherein after said specifying information of said received specifying data packet is stored in said specifying information storing means, the received specifying data packet is not provided to any other portions of the data driven processor.

6. The data driven information processor according to claim 5, wherein said specifying information storing means includes plural information item storing means having a plurality of regions for storing said specifying information items, and said receiving means includes comparing and determining means for sequentially comparing said designating information of said ordinary data packet received from any of said receiving ports with said specifying information items respectively stored in said plurality of regions and with said identifying information, and for determining whether or not said designating information matches any of said plurality of specifying information items and said identifying information.

7. The data driven information processor according to claim 6, wherein said comparing and determining means includes first precomparing means- responsive to reception of said ordinary data packet received from any of said receiving ports, for sequentially comparing said designating information of the received ordinary data packet respectively with said plurality of specifying information items stored in said plural information item storing means, for outputting the received ordinary data packet in response to matching of comparison between said designating information and at least any one of said plurality of specifying information items for rewriting said designating information of the received ordinary data packet to a content of said identifying information, and for directly outputting the received data packet in response to mismatching of comparison between said designating information and all of said plurality of specifying information items, and first main comparing means, responsive to reception of said received ordinary data packet output from said first precomparing means, for comparing said designating information of the received ordinary data packet and said identifying information to carry out said determining based on the comparison result.

8. The data driven information processor according to claim 7, wherein said first precomparing means includes rewriting means responsive to said matching of comparison for rewriting said designating information of said received ordinary data packet to a content of said identifying information.

9. The data driven information processor according to claim 6, wherein said plural information item storing means further includes a number information region in which information on the number of regions whose content is effective among said plurality of regions is set, and said comparing and determining means includes sequentially comparing and determining means for sequentially comparing said designating information of said ordinary data packet received from any of said receiving ports with said specifying information items respectively stored in effective regions of the number specified by said information on the number set in said number information region among said plurality of regions of said plural information item storing means and with said identifying information, and for determining whether or not said designating information matches any of said specifying information items respectively stored in said effective regions and said identifying information.

10. The data driven information processor according to claim 9, wherein said sequentially comparing and determining means includes second precomparing means, responsive to reception of said ordinary data packet received from any of said receiving ports, for sequentially comparing said designating information of the received ordinary data packet respectively with said specifying information items respectively stored in effective regions of the number specified by said information on the number set in said number information region among said plurality of regions of said plural information item storing means, for rewriting said designating information of the received ordinary data packet to a content of said identifying information to output the received ordinary data packet in response to matching of comparison between said designating information and at least one of said specifying information items, and for directly outputting the received ordinary data packet in response to mismatching of comparison between said designating information and all of said specifying information items for directly outputting the received ordinary data packet, and second main comparing means, responsive to reception of said received ordinary data packet output from said second precomparing means, for comparing said designating information of the received ordinary data packet and said identifying information to carry out said determining according to the comparison result.

11. The data driven information processor according to claim 10, wherein said second precomparing means includes rewriting means responsive to said mismatching of comparison for rewriting said designating information of said received ordinary data packet to a content of said identifying information.

12. The data driven information processor according to claim 5, further comprising a plurality of data packet output ports for outputting said ordinary data packet or said specifying data packet outside the data driven information processor, each of said data packet output ports being connected to any of said receiving ports of the plurality of data driven information processors.

13. The data driven information processor according to claim 12, wherein said specifying information storing means includes plural information item storing means having a plurality of regions for storing said specifying information items, and said receiving means includes comparing and determining means for sequentially comparing said designating information of said ordinary data packet received from any of said receiving ports with said specifying information items respectively stored in said plurality of regions and with said identifying information, and for determining whether or not said designating information matches any of said plurality of specifying information items and said identifying information.

14. The data driven information processor according to claim 13, wherein said comparing and determining means includes first precomparing means, responsive to reception of said ordinary data packet received from any of said receiving ports, for sequentially comparing said designating information of the received ordinary data packet respectively with said plurality of specifying information items stored in said plural information item storing means, for rewriting in response to matching of comparison between said designating information and at least any one of said plurality of specifying information items, said designating information of the received ordinary data packet to a content of said identifying information to output the received ordinary data packet, and for directly outputting the received ordinary data packet in response to mismatching of comparison between said designating information and all of said plurality of specifying information items, and first main comparing means, responsive to reception of said received ordinary data packet output from said first precomparing means, for comparing said designating information of the received ordinary data packet and said identifying information to carry out said determining based on the comparison result.

15. The data driven information processor according to claim 14, wherein said first precomparing means includes rewriting means responsive to said matching of comparison for rewriting said designating information of said received ordinary data packet to a content of said identifying information.

16. The data driven information processor according to claim 13, wherein said plural information item storing means further includes a number information region in which information on the number of regions whose content is effective among said plurality of regions is set, and said comparing and determining means includes sequentially comparing and determining means for sequentially comparing said designating information of said ordinary data packet received from any of said receiving ports with said specifying information items respectively stored in effective regions of the number specified by said information on the number set in said number information region among said plurality of regions of said plural information item storing means and with said identifying information and for determining whether or not said designating information matches any of said specifying information items respectively stored in said effective regions and said identifying information.

17. The data driven information processor according to claim 16, wherein said sequentially comparing and determining means includes second precomparing means, responsive to reception of said ordinary data packet received from any of said receiving ports, for sequentially comparing said designating information of the received ordinary data packet respectively with said specifying information items respectively stored in effective regions of the number specified by said information on the number set in said number information region among said plurality of regions of said plural information item storing means, for rewriting in response to matching of comparison between said designating information and at least any one of said specifying information items said designating information of the received ordinary data packet to a content of said identifying information to output the received ordinary data packet, and for directly outputting the received ordinary data packet in response to mismatching of comparison between said designating information and all of said specifying information items, and second main comparing means, responsive to reception of said received ordinary data packet output from said second precomparing means, for comparing said designating information of the received ordinary data packet and said identifying information to carry out said determining according to the comparison result.

18. The data driven information processor according to claim 17, wherein said second precomparing means includes rewriting means, responsive to said mismatching of comparison, for rewriting said designating information of said received ordinary data packet to a content of said identifying information.

19. The data driven information processor according to claim 12, wherein said receiving means includes comparing and determining means for simultaneously comparing said designating information of said ordinary data packet received from any of said receiving ports respectively with said one or more specifying information items stored in said specifying information storing means and with said identifying information, and for determining whether or not said designating information matches any of said one or more specifying information items and said identifying information.

20. The data driven information processor according to claim 19, wherein said comparing and determining means includes first and second comparing means for simultaneously receiving said ordinary data packet received from any of said receiving ports, said first comparing means, responsive to reception of said received ordinary data packet, for comparing said designating information of the received ordinary data packet and each of said one or more specifying information items stored in said specifying information storing means outputting a first comparison result, and said second comparing means, responsive to reception of said received ordinary data packet, for comparing said designating information of the received ordinary data packet and said identifying information and outputting a second comparison result; and determining means for carrying out said determination based on said first and second comparison results output from said first and second comparing means, said first comparing means is responsive to reception of said received ordinary data packet to compare said designating information of the received ordinary data packet and each of said one or more specifying information items stored in said specifying information storing means to output said comparison result; and said second comparing means is responsive to reception of said received ordinary data packet to compare said designating information of the received ordinary data packet and said identifying information to output said comparison result.

21. The data driven information processor according to claim 5, wherein said receiving means includes comparing and determining means for simultaneously comparing said designating information of said ordinary data packet received from any of said receiving ports respectively with said one or more specifying information items stored in said specifying information storing means and with said identifying information, and for determining whether or not said designating information matches any of said one or more specifying information items and said identifying information.

22. The data driven information processor according to claim 21, wherein said comparing and determining means includes first and second comparing means for simultaneously receiving said ordinary data packet received from any of said receiving ports, said first comparing means, responsive to reception of said received ordinary data packet, for comparing said designating information of the received ordinary data packet and each of said one or more specifying information items stored in said specifying information storing means outputting a first comparison result, and said second comparing means, responsive to reception of said received ordinary data packet, for comparing said designating information of the received ordinary data packet and said identifying information and outputting a second comparison result; and determining means for carrying out said determination based on said first and second comparison results output from said first and second comparing means.

23. The data driven information processor according to claim 2, further comprising a plurality of data packet output ports for outputting said ordinary data packet or said specifying data packet outside the data driver information processor, each of said data packet output ports being connected to any of said receiving ports of the plurality of remaining data driven information processors.

24. The data driven information processor according to claim 23, wherein said receiving means includes comparing and determining means for simultaneously comparing said designating information of said ordinary data packet received from any of said receiving ports respectively with said one or more specifying information items stored in said specifying information storing means and with said identifying information, and for determining whether or not said designating information matches any of said one or more specifying information items and said identifying information.

25. The data driven information processor according to claim 24, wherein said comparing and determining means includes first and second comparing means for simultaneously receiving said ordinary data packet received from any of said receiving ports, said first comparing means, responsive to reception of said received ordinary data packet, for comparing said designating information of the received ordinary data packet and each of said one or more specifying information items stored in said specifying information storing means outputting a first comparison result, and said second comparing means, responsive to reception of said received ordinary data packet, for comparing said designating information of the received ordinary data packet and said identifying information and outputting a second comparison result; and determining means for carrying out said determination based on said first and second comparison results output from said first and second comparing means.

26. The data driven information processor according to claim 23, wherein said specifying information storing means includes plural information item storing means having a plurality of regions for storing said specifying information items, and said receiving means includes comparing and determining means for sequentially comparing said designating information of said ordinary data packet received from any of said receiving ports with said specifying information items respectively stored in said plurality of regions and with said identifying information, and for determining whether or not said designating information matches any of said plurality of specifying information items and said identifying information.

27. The data driven information processor according to claim 26, wherein said plural information item storing means further includes a number information region in which information on the number of regions whose content is effective among said plurality of regions is set, and said comparing and determining means includes sequentially comparing and determining means for sequentially comparing said designating information of said ordinary data packet received from any of said receiving ports with said specifying information items respectively stored in effective regions of the number specified by said information on the number set in said number information region among said plurality of regions of said plural information item storing means and with said identifying information, and for determining whether or not said designating information matches any of said specifying information items respectively stored in said effective regions and said identifying information.

28. The data driven information processor according to claim 27, wherein said sequentially comparing and determining means includes second precomparing means, responsive to reception of said ordinary data packet received from any of said receiving ports, for sequentially comparing said designating information of the received ordinary data packet respectively with said specifying information items respectively stored in effective regions of the number specified by said information on the number set in said number information region among said plurality of regions of said plural information item storing means, for rewriting said designating information of the received ordinary data packet to a content of said identifying information to output the received ordinary data packet in response to matching of comparison between said designating information and at least one of said specifying information items, and for directly outputting the received ordinary data packet in response to mismatching of comparison between said designating information and all of said specifying information items for directly outputting the received ordinary data packet, and second main comparing means, responsive to reception of said received ordinary data packet output from said second precomparing means, for comparing said designating information of the received ordinary data packet and said identifying information to carry out said determining according to the comparison result.

29. The data driven information processor according to claim 28, wherein said second precomparing means includes rewriting means responsive to said mismatching of comparison for rewriting said designating information of said received ordinary data packet to a content of said identifying information.

30. The data driven information processor according to claim 26, wherein said comparing and determining means includes first precomparing means, responsive to reception of said ordinary data packet received from any of said receiving ports, for sequentially comparing said designating information of the received ordinary data packet respectively with said plurality of specifying information items stored in said plural information item storing means, for outputting the received ordinary data packet in response to matching of comparison between said designating information and at least any one of said plurality of specifying information items for rewriting said designating information of the received ordinary data packet to a content of said identifying information, and for directly outputting the received data packet in response to mismatching of comparison between said designating information and all of said plurality of specifying information items, and first main comparing means, responsive to reception of said received ordinary data packet output from said first precomparing means, for comparing said designating information of the received ordinary data packet and said identifying information to carry out said determining based on the comparison result.

31. The data driven information processor according to claim 30, wherein said first precomparing means includes rewriting means responsive to said matching of comparison for rewriting said designating information of said received ordinary data packet to a content of said identifying information.

32. The data driven information processor according to claim 2, wherein said specifying information storing means includes plural information item storing means having a plurality of regions for storing said specifying information items, and said receiving means includes comparing and determining means for sequentially comparing said designating information of said ordinary data packet received from any of said receiving ports with said specifying information items respectively stored in said plurality of regions and with said identifying information, and for determining whether or not said designating information matches any of said plurality of specifying information items and said identifying information.

33. The data driven information processor according to claim 32, wherein said plural information item storing means further includes a number information region in which information on the number of regions whose content is effective among said plurality of regions is set, and said comparing and determining means includes sequentially comparing and determining means for sequentially comparing said designating information of said ordinary data packet received from any of said receiving ports with said specifying information items respectively stored in effective regions of the number specified by said information on the number set in said number information region among said plurality of regions of said plural information item storing means and with said identifying information and for determining whether or not said designating information matches any of said specifying information items respectively stored in said effective regions and said identifying information.

34. The data driven information processor according to claim 33, wherein said sequentially comparing and determining means includes second precomparing means, responsive to reception of said ordinary data packet received from any of said receiving ports, for sequentially comparing said designating information of the received ordinary data packet respectively with said specifying information items respectively stored in effective regions of the number specified by said information on the number set in said number information region among said plurality of regions of said plural information item storing means, for rewriting in response to matching of comparison between said designating information and at least any one of said specifying information items said designating information of the received ordinary data packet to a content of said identifying information to output the received ordinary data packet, and for directly outputting the received ordinary data packet in response to mismatching of comparison between said designating information and all of said specifying information items, and second main comparing means, responsive to reception of said received ordinary data packet output from said second precomparing means, for comparing said designating information of the received ordinary data packet and said identifying information to carry out said determining according to the comparison result.

35. The data driven information processor according to claim 34, wherein said second precomparing means includes rewriting means responsive to said mismatching of comparison for rewriting said designating information of said received ordinary data packet to a content of said identifying information.

36. The data driven information processor according to claim 32, wherein said comparing and determining means includes first precomparing means, responsive to reception of said ordinary data packet received from any of said receiving ports, for sequentially comparing said designating information of the received ordinary data packet respectively with said plurality of specifying information items stored in said plural information item storing means, for outputting the received ordinary data packet in response to matching of comparison between said designating information and at least any one of said plurality of specifying information items for rewriting said designating information of the received ordinary data packet to a content of said identifying information, and for directly outputting the received data packet in response to mismatching of comparison between said designating information and all of said plurality of specifying information items, and first main comparing means, responsive to reception of said received ordinary data packet output from said first precomparing means, for comparing said designating information of the received ordinary data packet and said identifying information to carry out said determining based on the comparison result.

37. The data driven information processor according to claim 36, wherein said first precomparing means includes rewriting means responsive to said matching of comparison for rewriting said designating information of said received ordinary data packet to a content of said identifying information.

38. The data driven information processor according to claim 1, wherein said receiving means includes comparing and determining means for simultaneously comparing said designating information of said ordinary data packet received from any of said receiving ports respectively with said one or more specifying information items stored in said specifying information storing means and with said identifying information, and for determining whether or not said designating information matches any of said one or more specifying information items and said identifying information.

39. The data driven information processor according to claim 38, wherein said comparing and determining means includes first and second comparing means for simultaneously receiving said ordinary data packet received from any of said receiving ports, said first comparing means, responsive to reception of said received ordinary data packet, for comparing said designating information of the received ordinary data packet and each of said one or more specifying information items stored in said specifying information storing means outputting a first comparison result, and said second comparing means, responsive to reception of said received ordinary data packet, for comparing said designating information of the received ordinary data packet and said identifying information and outputting a second comparison result; and determining means for carrying out said determination based on said first and second comparison results output from said first and second comparing means.

40. The data driven information processor according to claim 1, wherein said specifying data packet further includes processor specifying information for specifying a processor to which said specifying information in the specifying data packet should be supplied among said plurality of data driven information processors, and said data driven information processors, responsive to matching of said processor specifying information of said specific data packet received from any of said receiving ports and said identifying information, storing said specifying information of the received specifying data packet in said specifying information storing means.

41. The data driven information processor according to claim 40, wherein said receiving means includes comparing and determining means for simultaneously comparing said designating information of said ordinary data packet received from any of said receiving ports respectively with said one or more specifying information items stored in said specifying information storing means and with said identifying information, and for determining whether or not said designating information matches any of said one or more specifying information items and said identifying information.

42. The data driven information processor according to claim 41, wherein said comparing and determining means includes first precomparing means, responsive to reception of said ordinary data packet received from any of said receiving ports, for sequentially comparing said designating information of the received ordinary data packet respectively with said plurality of specifying information items stored in said plural information item storing means, for outputting the received ordinary data packet in response to matching of comparison between said designating information and at least any one of said plurality of specifying information items for rewriting said designating information of the received ordinary data packet to a content of said identifying information, and for directly outputting the received data packet in response to mismatching of comparison between said designating information and all of said plurality of specifying information items, and first main comparing means, responsive to reception of said received ordinary data packet output from said first precomparing means, for comparing said designating information of the received ordinary data packet and said identifying information to carry out said determining based on the comparison result.

43. The data driven information processor according to claim 42, wherein said first precomparing means includes rewriting means responsive to said matching of comparison for rewriting said designating information of said received ordinary data packet to a content of said identifying information.

44. The data driven information processor according to claim 41, wherein said plural information item storing means further includes a number information region in which information on the number of regions whose content is effective among said plurality of regions is set, and said comparing and determining means includes sequentially comparing and determining means for sequentially comparing said designating information of said ordinary data packet received from any of said receiving ports with said specifying information items respectively stored in effective regions of the number specified by said information on the number set in said number information region among said plurality of regions of said plural information item storing means and with said identifying information, and for determining whether or not said designating information matches any of said specifying information items respectively stored in said effective regions and said identifying information.

45. The data driven information processor according to claim 44, wherein second precomparing means, responsive to reception of said ordinary data packet received from any of said receiving ports, for sequentially comparing said designating information of the received ordinary data packet respectively with said specifying information items respectively stored in effective regions of the number specified by said information on the number set in said number information region among said plurality of regions of said plural information item storing means, for rewriting said designating information of the received ordinary data packet to a content of said identifying information to output the received ordinary data packet in response to matching of comparison between said designating information and at least one of said specifying information items, and for directly outputting the received ordinary data packet in response to mismatching of comparison between said designating information and all of said specifying information items for directly outputting the received ordinary data packet, and second main comparing means, responsive to reception of said received ordinary data packet output from said second precomparing means, for comparing said designating information of the received ordinary data packet and said identifying information to carry out said determining according to the comparison result.

46. The data driven information processor according to claim 45, wherein said second precomparing means includes rewriting means responsive to said mismatching of comparison for rewriting said designating information of said received ordinary data packet to a content of said identifying information.

47. The data driven information processor according to claim 40, further comprising a plurality of data packet output ports for outputting said ordinary data packet or said specifying data packet outside the data driven information processor, each of said data packet output ports being connected to any of said receiving ports of the plurality of data driven information processors.

48. The data driven information processor according to claim 47, wherein said specifying information storing means includes plural information item storing means having a plurality of regions for storing said specifying information items, and said receiving means includes comparing and determining means for sequentially comparing said designating information of said ordinary data packet received from any of said receiving ports with said specifying information items respectively stored in said plurality of regions and with said identifying information, and for determining whether or not said designating information matches any of said plurality of specifying information items and said identifying information.

49. The data driven information processor according to claim 48, wherein said comparing and determining means includes first precomparing means, responsive to reception of said ordinary data packet received from any of said receiving ports, for sequentially comparing said designating information of the received ordinary data packet respectively with said plurality of specifying information items stored in said plural information item storing means, for outputting the received ordinary data packet in response to matching of comparison between said designating information and at least any one of said plurality of specifying information items for rewriting said designating information of the received ordinary data packet to a content of said identifying information, and for directly outputting the received data packet in response to mismatching of comparison between said designating information and all of said plurality of specifying information items, and first main comparing means, responsive to reception of said received ordinary data packet output from said first precomparing means, for comparing said designating information of the received ordinary data packet and said identifying information to carry out said determining based on the comparison result.

50. The data driven information processor according to claim 49, wherein said first precomparing means includes rewriting means responsive to said matching of comparison for rewriting said designating information of said received ordinary data packet to a content of said identifying information.

51. The data driven information processor according to claim 48, wherein said plural information item storing means further includes a number information region in which information on the number of regions whose content is effective among said plurality of regions is set, and said comparing and determining means includes sequentially comparing and determining means for sequentially comparing said designating information of said ordinary data packet received from any of said receiving ports with said specifying information items respectively stored in effective regions of the number specified by said information on the number set in said number information region among said plurality of regions of said plural information item storing means and with said identifying information, and for determining whether or not said designating information matches any of said specifying information items respectively stored in said effective regions and said identifying information.

52. The data driven information processor according to claim 51, wherein said sequentially comparing and determining means includes second precomparing means, responsive to reception of said ordinary data packet received from any of said receiving ports, for sequentially comparing said designating information of the received ordinary data packet respectively with said specifying information items respectively stored in effective regions of the number specified by said information on the number set in said number information region among said plurality of regions of said plural information item storing means, for rewriting said designating information of the received ordinary data packet to a content of said identifying information to output the received ordinary data packet in response to matching of comparison between said designating information and at least one of said specifying information items, and for directly outputting the received ordinary data packet in response to mismatching of comparison between said designating information and all of said specifying information items for directly outputting the received ordinary data packet, and second main comparing means, responsive to reception of said received ordinary data packet output from said second precomparing means, for comparing said designating information of the received ordinary data packet and said identifying information to carry out said determining according to the comparison result.

53. The data driven information processor according to claim 52, wherein said second precomparing means includes rewriting means responsive to said mismatching of comparison for rewriting said designating information of said received ordinary data packet to a content of said identifying information.

54. The data driven information processor according to claim 47, wherein said receiving means includes comparing and determining means for simultaneously comparing said designating information of said ordinary data packet received from any of said receiving ports respectively with said one or more specifying information items stored in said specifying information storing means and with said identifying information, and for determining whether or not said designating information matches any of said one or more specifying information items and said identifying information.

55. The data driven information processor according to claim 54, wherein said comparing and determining means includes first and second comparing means for simultaneously receiving said ordinary data packet received from any of said receiving ports, said first comparing means, responsive to reception of said received ordinary data packet, for comparing said designating information of the received ordinary data packet and each of said one or more specifying information items stored in said specifying information storing means outputting a first comparison result, and said second comparing means, responsive to reception of said received ordinary data packet, for comparing said designating information of the received ordinary data packet and said identifying information and outputting a second comparison result; and determining means for carrying out said determination based on said first and second comparison results output from said first and second comparing means.

56. The data driven information processor according to claim 40, wherein in response to mismatching match between said specifying information of said specifying data packet received from any of said receiving ports and said identifying information, the received specifying data packet is sent outside the data driven information processor.

57. The data driven information processor according to claim 56, wherein said specifying information storing means includes plural information item storing means having a plurality of regions for storing said specifying information items, and said receiving means includes comparing and determining means for sequentially comparing said designating information of said ordinary data packet received from any of said receiving ports with said specifying information items respectively stored in said plurality of regions and with said identifying information, and for determining whether or not said designating information matches any of said plurality of specifying information items and said identifying information.

58. The data driven information processor according to claim 57, wherein said comparing and determining means includes first precomparing means, responsive to reception of said ordinary data packet received from any of said receiving ports, for sequentially comparing said designating information of the received ordinary data packet respectively with said plurality of specifying information items stored in said plural information item storing means, for outputting the received ordinary data packet in response to matching of comparison between said designating information and at least any one of said plurality of specifying information items for rewriting said designating information of the received ordinary data packet to a content of said identifying information, and for directly outputting the received data packet in response to mismatching of comparison between said designating information and all of said plurality of specifying information items, and first main comparing means, responsive to reception of said received ordinary data packet output from said first precomparing means, for comparing said designating information of the received ordinary data packet and said identifying information to carry out said determining based on the comparison result.

59. The data driven information processor according to claim 58, wherein said first precomparing means includes rewriting means responsive to said matching of comparison for rewriting said designating information of said received ordinary data packet to a content of said identifying information.

60. The data driven information processor according to claim 57, wherein said plural information item storing means further includes a number information region in which information on the number of regions whose content is effective among said plurality of regions is set, and said comparing and determining means includes sequentially comparing and determining means for sequentially comparing said designating information of said ordinary data packet received from any of said receiving ports with said specifying information items respectively stored in effective regions of the number specified by said information on the number set in said number information region among said plurality of regions of said plural information item storing means and with said identifying information, and for determining whether or not said designating information matches any of said specifying information items respectively stored in said effective regions and said identifying information.

61. The data driven information processor according to claim 60, wherein said sequentially comparing and determining means includes second precomparing means, responsive to reception of said ordinary data packet received from any of said receiving ports, for sequentially comparing said designating information of the received ordinary data packet respectively with said specifying information items respectively stored in effective regions of the number specified by said information on the number set in said number information region among said plurality of regions of said plural information item storing means, for rewriting said designating information of the received ordinary data packet to a content of said identifying information to output the received ordinary data packet in response to matching of comparison between said designating information and at least one of said specifying information items, and for directly outputting the received ordinary data packet in response to mismatching of comparison between said designating information and all of said specifying information items for directly outputting the received ordinary data packet, and second main comparing means, responsive to reception of said received ordinary data packet output from said second precomparing means, for comparing said designating information of the received ordinary data packet and said identifying information to carry out said determining according to the comparison result.

62. The data driven information processor according to claim 61, wherein said second precomparing means includes rewriting means responsive to said mismatching of comparison for rewriting said designating information of said received ordinary data packet to a content of said identifying information.

63. The data driven information processor according to claim 56, further comprising a plurality of data packet output ports for outputting said ordinary data packet or said specifying data packet outside the data driven information processor, each of said data packet output ports being connected to any of said receiving ports of the plurality of data driven information processors.

64. The data driven information processor according to claim 63, wherein said specifying information storing means includes plural information item storing means having a plurality of regions for storing said specifying information items, and said receiving means includes comparing and determining means for sequentially comparing said designating information of said ordinary data packet received from any of said receiving ports with said specifying information items respectively stored in said plurality of regions and with said identifying information, and for determining whether or not said designating information matches any of said plurality of specifying information items and said identifying information.

65. The data driven information processor according to claim 64, wherein said comparing and determining means includes first precomparing means responsive to reception of said ordinary data packet received from any of said receiving ports, for sequentially comparing said designating information of the received ordinary data packet respectively with said plurality of specifying information items stored in said plural information item storing means, for outputting the received ordinary data packet in response to matching of comparison between said designating information and at least any one of said plurality of specifying information items for rewriting said designating information of the received ordinary data packet to a content of said identifying information, and for directly outputting the received data packet in response to mismatching of comparison between said designating information and all of said plurality of specifying information items, and first main comparing means, responsive to reception of said received ordinary data packet output from said first precomparing means, for comparing said designating information of the received ordinary data packet and said identifying information to carry out said determining based on the comparison result.

66. The data driven information processor according to claim 65, wherein said first precomparing means includes rewriting means responsive to said matching of comparison for rewriting said designating information of said received ordinary data packet to a content of said identifying information.

67. The data driven information processor according to claim 64, wherein said plural information item storing means further includes a number information region in which information on the number of regions whose content is effective among said plurality of regions is set, and said comparing and determining means includes sequentially comparing and determining means for sequentially comparing said designating information of said ordinary data packet received from any of said receiving ports with said specifying information items respectively stored in effective regions of the number specified by said information on the number set in said number information region among said plurality of regions of said plural information item storing means and with said identifying information, and for determining whether or not said designating information matches any of said specifying information items respectively stored in said effective regions and said identifying information.

68. The data driven information processor according to claim 67, wherein said sequentially comparing and determining means includes second precomparing means, responsive to reception of said ordinary data packet received from any of said receiving ports, for sequentially comparing said designating information of the received ordinary data packet respectively with said specifying information items respectively stored in effective regions of the number specified by said information on the number set in said number information region among said plurality of regions of said plural information item storing means, for rewriting said designating information of the received ordinary data packet to a content of said identifying information to output the received ordinary data packet in response to matching of comparison between said designating information and at least one of said specifying information items, and for directly outputting the received ordinary data packet in response to mismatching of comparison between said designating information and all of said specifying information items for directly outputting the received ordinary data packet, and second main comparing means, responsive to reception of said received ordinary data packet output from said second precomparing means, for comparing said designating information of the received ordinary data packet and said identifying information to carry out said determining according to the comparison result.

69. The data driven information processor according to claim 68, wherein said second precomparing means includes rewriting means responsive to said mismatching of comparison for rewriting said designating information of said received ordinary data packet to a content of said identifying information.

70. The data driven information processor according to claim 63, wherein said receiving means includes comparing and determining means for simultaneously comparing said designating information of said ordinary data packet received from any of said receiving ports respectively with said one or more specifying information items stored in said specifying information storing means and with said identifying information, and for determining whether or not said designating information matches any of said one or more specifying information items and said identifying information.

71. The data driven information processor according to claim 70, wherein said comparing and determining means includes first and second comparing means for simultaneously receiving said ordinary data packet received from any of said receiving ports, said first comparing means, responsive to reception of said received ordinary data packet, for comparing said designating information of the received ordinary data packet and each of said one or more specifying information items stored in said specifying information storing means outputting a first comparison result, and said second comparing means, responsive to reception of said received ordinary data packet, for comparing said designating information of the received ordinary data packet and said identifying information and outputting a second comparison result; and determining means for carrying out said determination based on said first and second comparison results output from said first and second comparing means.

72. The data driven information processor according to claim 56, wherein said receiving means includes comparing and determining means for simultaneously comparing said designating information of said ordinary data packet received from any of said receiving ports respectively with said one or more specifying information items stored in said specifying information storing means and with said identifying information, and for determining whether or not said designating information matches any of said one or more specifying information items and said identifying information.

73. The data driven information processor according to claim 72, wherein said comparing and determining means includes first and second comparing means for simultaneously receiving said ordinary data packet received from any of said receiving ports, said first comparing means, responsive to reception of said received ordinary data packet, for comparing said designating information of the received ordinary data packet and each of said one or more specifying information items stored in said specifying information storing means outputting a first comparison result, and said second comparing means, responsive to reception of said received ordinary data packet, for comparing said designating information of the received ordinary data packet and said identifying information and outputting a second comparison result; and determining means for carrying out said determination based on said first and second comparison results output from said first and second comparing means.

74. The data driven information processor according to claim 40, wherein said receiving means includes comparing and determining means for simultaneously comparing said designating information of said ordinary data packet received from any of said receiving ports respectively with said one or more specifying information items stored in said specifying information storing means and with said identifying information, and for determining whether or not said designating information matches any of said one or more specifying information items and said identifying information.

75. The data driven information processor according to claim 74, wherein said comparing and determining means includes first and second comparing means for simultaneously receiving said ordinary data packet received from any of said receiving ports, said first comparing means, responsive to reception of said received ordinary data packet, for comparing said designating information of the received ordinary data packet and each of said one or more specifying information items stored in said specifying information storing means outputting a first comparison result, and said second comparing means, responsive to reception of said received ordinary data packet, for comparing said designating information of the received ordinary data packet and said identifying information and outputting a second comparison result; and determining means for carrying out said determination based on said first and second comparison results output from said first and second comparing means.

76. The data driven information processor according to claim 40, wherein after said specifying information of said received specifying data packet is stored in said specifying information storing means, the received specifying data packet is not provided to any other portions of the data driven information processor.

77. The data driven information processor according to claim 76, further comprising a plurality of data packet output ports for outputting said ordinary data packet or said specifying data packet outside the data driven information processor, each of said data packet output ports being connected to any of said receiving ports of the plurality of data driven information processors.

78. The data driven information processor according to claim 77, wherein said specifying information storing means includes plural information item storing means having a plurality of regions for storing said specifying information items, and said receiving means includes comparing and determining means for sequentially comparing said designating information of said ordinary data packet received from any of said receiving ports with said specifying information items respectively stored in said plurality of regions and with said identifying information, and for determining whether or not said designating information matches any of said plurality of specifying information items and said identifying information.

79. The data driven information processor according to claim 78, wherein said comparing and determining means includes first precomparing means, responsive to reception of said ordinary data packet received from any of said receiving ports, for sequentially comparing said designating information of the received ordinary data packet respectively with said plurality of specifying information items stored in said plural information item storing means, for outputting the received ordinary data packet in response to matching of comparison between said designating information and at least any one of said plurality of specifying information items for rewriting said designating information of the received ordinary data packet to a content of said identifying information, and for directly outputting the received data packet in response to mismatching of comparison between said designating information and all of said plurality of specifying information items, and first main comparing means, responsive to reception of said received ordinary data packet output from said first precomparing means, for comparing said designating information of the received ordinary data packet and said identifying information to carry out said determining based on the comparison result.

80. The data driven information processor according to claim 79, wherein said first precomparing means includes rewriting means responsive to said matching of comparison for rewriting said designating information of said received ordinary data packet to a content of said identifying information.

81. The data driven information processor according to claim 78, wherein said plural information item storing means further includes a number information region in which information on the number of regions whose content is effective among said plurality of regions is set, and said comparing and determining means includes sequentially comparing and determining means for sequentially comparing said designating information of said ordinary data packet received from any of said receiving ports with said specifying information items respectively stored in effective regions of the number specified by said information on the number set in said number information region among said plurality of regions of said plural information item storing means and with said identifying information, and for determining whether or not said designating information matches any of said specifying information items respectively stored in said effective regions and said identifying information.

82. The data driven information processor according to claim 81, wherein said sequentially comparing and determining means includes second precomparing means, responsive to reception of said ordinary data packet received from any of said receiving ports, for sequentially comparing said designating information of the received ordinary data packet respectively with said specifying information items respectively stored in effective regions of the number specified by said information on the number set in said number information region among said plurality of regions of said plural information item storing means, for rewriting said designating information of the received ordinary data packet to a content of said identifying information to output the received ordinary data packet in response to matching of comparison between said designating information and at least one of said specifying information items, and for directly outputting the received ordinary data packet in response to mismatching of comparison between said designating information and all of said specifying information items for directly outputting the received ordinary data packet, and second main comparing means, responsive to reception of said received ordinary data packet output from said second precomparing means, for comparing said designating information of the received ordinary data packet and said identifying information to carry out said determining according to the comparison result.

83. The data driven information processor according to claim 82, wherein said second precomparing means includes rewriting means responsive to said mismatching of comparison for rewriting said designating information of said received ordinary data packet to a content of said identifying information.

84. The data driven information processor according to claim 77, wherein said receiving means includes comparing and determining means for simultaneously comparing said designating information of said ordinary data packet received from any of said receiving ports respectively with said one or more specifying information items stored in said specifying information storing means and with said identifying information, and for determining whether or not said designating information matches any of said one or more specifying information items and said identifying information.

85. The data driven information processor according to claim 84, wherein said comparing and determining means includes first and second comparing means for simultaneously receiving said ordinary data packet received from any of said receiving ports, said first comparing means, responsive to reception of said received ordinary data packet, for comparing said designating information of the received ordinary data packet and each of said one or more specifying information items stored in said specifying information storing means outputting a first comparison result, and said second comparing means, responsive to reception of said received ordinary data packet, for comparing said designating information of the received ordinary data packet and said identifying information and outputting a second comparison result; and determining means for carrying out said determination based on said first and second comparison results output from said first and second comparing means.

86. The data driven information processor according to claim 76, wherein said specifying information storing means includes plural information item storing means having a plurality of regions for storing said specifying information items, and said receiving means includes comparing and determining means for sequentially comparing said designating information of said ordinary data packet received from any of said receiving ports with said specifying information items respectively stored in said plurality of regions and with said identifying information, and for determining whether or not said designating information matches any of said plurality of specifying information items and said identifying information.

87. The data driven information processor according to claim 86, wherein said comparing and determining means includes first precomparing means, responsive to reception of said ordinary data packet received from any of said receiving ports, for sequentially comparing said designating information of the received ordinary data packet respectively with said plurality of specifying information items stored in said plural information item storing means, for outputting the received ordinary data packet in response to matching of comparison between said designating information and at least any one of said plurality of specifying information items for rewriting said designating information of the received ordinary data packet to a content of said identifying information, and for directly outputting the received data packet in response to mismatching of comparison between said designating information and all of said plurality of specifying information items, and first main comparing means, responsive to reception of said received ordinary data packet output from said first precomparing means, for comparing said designating information of the received ordinary data packet and said identifying information to carry out said determining based on the comparison result.

88. The data driven information processor according to claim 87, wherein said first precomparing means includes rewriting means responsive to said matching of comparison for rewriting said designating information of said received ordinary data packet to a content of said identifying information.

89. The data driven information processor according to claim 86, wherein said plural information item storing means further includes a number information region in which information on the number of regions whose content is effective among said plurality of regions is set, and said comparing and determining means includes sequentially comparing and determining means for sequentially comparing said designating information of said ordinary data packet received from any of said receiving ports with said specifying information items respectively stored in effective regions of the number specified by said information on the number set in said number information region among said plurality of regions of said plural information item storing means and with said identifying information, and for determining whether or not said designating information matches any of said specifying information items respectively stored in said effective regions and said identifying information.

90. The data driven information processor according to claim 89, wherein said sequentially comparing and determining means includes second precomparing means, responsive to reception of said ordinary data packet received from any of said receiving ports, for sequentially comparing said designating information of the received ordinary data packet respectively with said specifying information items respectively stored in effective regions of the number specified by said information on the number set in said number information region among said plurality of regions of said plural information item storing means, for rewriting said designating information of the received ordinary data packet to a content of said identifying information to output the received ordinary data packet in response to matching of comparison between said designating information and at least one of said specifying information items, and for directly outputting the received ordinary data packet in response to mismatching of comparison between said designating information and all of said specifying information items for directly outputting the received ordinary data packet, and second main comparing means, responsive to reception of said received ordinary data packet output from said second precomparing means, for comparing said designating information of the received ordinary data packet and said identifying information to carry out said determining according to the comparison result.

91. The data driven information processor according to claim 90, wherein said second precomparing means includes rewriting means responsive to said mismatching of comparison for rewriting said designating information of said received ordinary data packet to a content of said identifying information.

92. The data driven information processor according to claim 76, wherein said receiving means includes comparing and determining means for simultaneously comparing said designating information of said ordinary data packet received from any of said receiving ports respectively with said one or more specifying information items stored in said specifying information storing means and with said identifying information, and for determining whether or not said designating information matches any of said one or more specifying information items and said identifying information.

93. The data driven information processor according to claim 92, wherein said comparing and determining means includes first and second comparing means for simultaneously receiving said ordinary data packet received from any of said receiving ports, said first comparing means, responsive to reception of said received ordinary data packet, for comparing said designating information of the received ordinary data packet and each of said one or more specifying information items stored in said specifying information storing means outputting a first comparison result, and said second comparing means, responsive to reception of said received ordinary data packet, for comparing said designating information of the received ordinary data packet and said identifying information and outputting a second comparison result; and determining means for carrying out said determination based on said first and second comparison results output from said first and second comparing means.

94. The data driven information processor according to claim 1, wherein said specifying information storing means includes plural information item storing means having a plurality of regions for storing said specifying information items, and said receiving means includes comparing and determining means for sequentially comparing said designating information of said ordinary data packet received from any of said receiving ports with said specifying information items respectively stored in said plurality of regions and with said identifying information, and for determining whether or not said designating information matches any of said plurality of specifying information items and said identifying information.

95. The data driven information processor according to claim 94, wherein said plural information item storing means further includes a number information region in which information on the number of regions whose content is effective among said plurality of regions is set, and said comparing and determining means includes sequentially comparing and determining means for sequentially comparing said designating information of said ordinary data packet received from any of said receiving ports with said specifying information items respectively stored in effective regions of the number specified by said information on the number set in said number information region among said plurality of regions of said plural information item storing means and with said identifying information, and for determining whether or not said designating information matches any of said specifying information items respectively stored in said effective regions and said identifying information.

96. The data driven information processor according to claim 95, wherein said sequentially comparing and determining means includes second precomparing means, responsive to reception of said ordinary data packet received from any of said receiving ports, for sequentially comparing said designating information of the received ordinary data packet respectively with said specifying information items respectively stored in effective regions of the number specified by said information on the number set in said number information region among said plurality of regions of said plural information item storing means, for rewriting said designating information of the received ordinary data packet to a content of said identifying information to output the received ordinary data packet in response to matching of comparison between said designating information and at least one of said specifying information items, and for directly outputting the received ordinary data packet in response to mismatching of comparison between said designating information and all of said specifying information items for directly outputting the received ordinary data packet, and second main comparing means, responsive to reception of said received ordinary data packet output from said second precomparing means, for comparing said designating information of the received ordinary data packet and said identifying information to carry out said determining according to the comparison result.

97. The data driven information processor according to claim 96, wherein said second precomparing means includes rewriting means responsive to said mismatching of comparison for rewriting said designating information of said received ordinary data packet to a content of said identifying information.

98. The data driven information processor according to claim 94, wherein said comparing and determining means includes first precomparing means, responsive to reception of said ordinary data packet received from any of said receiving ports, for sequentially comparing said designating information of the received ordinary data packet respectively with said plurality of specifying information items stored in said plural information item storing means, for outputting the received ordinary data packet in response to matching of comparison between said designating information and at least any one of said plurality of specifying information items for rewriting said designating information of the received ordinary data packet to a content of said identifying information, and for directly outputting the received data packet in response to mismatching of comparison between said designating information and all of said plurality of specifying information items, and first main comparing means, responsive to reception of said received ordinary data packet output from said first precomparing means, for comparing said designating information of the received ordinary data packet and said identifying information to carry out said determining based on the comparison result.

99. The data driven information processor according to claim 98, wherein said first precomparing means includes rewriting means responsive to said matching of comparison for rewriting said designating information of said received ordinary data packet to a content of said identifying information.

100. The data driven information processor according to claim 1, further comprising a plurality of data packet output ports for outputting said ordinary data packet or said specifying data packet outside the data driven information processor, each of said data packet output ports being connected to any of said receiving ports of the plurality of data driven information processors.

101. The data driven information processor according to claim 100, wherein said receiving means includes comparing and determining means for simultaneously comparing said designating information of said ordinary data packet received from any of said receiving ports respectively with said one or more specifying information items stored in said specifying information storing means and with said identifying information, and for determining whether or not said designating information matches any of said one or more specifying information items and said identifying information.

102. The data driven information processor according to claim 101, wherein said comparing and determining means includes first and second comparing means for simultaneously receiving said ordinary data packet received from any of said receiving ports, said first comparing means, responsive to reception of said received ordinary data packet, for comparing said designating information of the received ordinary data packet and each of said one or more specifying information items stored in said specifying information storing means outputting a first comparison result, and said second comparing means, responsive to reception of said received ordinary data packet, for comparing said designating information of the received ordinary data packet and said identifying information and outputting a second comparison result; and determining means for carrying out said determination based on said first and second comparison results output from said first and second comparing means.

103. The data driven information processor according to claim 100, wherein said specifying information storing means includes plural information item storing means having a plurality of regions for storing said specifying information items, and said receiving means includes comparing and determining means for sequentially comparing said designating information of said ordinary data packet received from any of said receiving ports with said specifying information items respectively stored in said plurality of regions and with said identifying information, and for determining whether or not said designating information matches any of said plurality of specifying information items and said identifying information.

104. The data driven information processor according to claim 103, wherein said plural information item storing means further includes a number information region in which information on the number of regions whose content is effective among said plurality of regions is set, and said comparing and determining means includes sequentially comparing and determining means for sequentially comparing said designating information of said ordinary data packet received from any of said receiving ports with said specifying information items respectively stored in effective regions of the number specified by said information on the number set in said number information region among said plurality of regions of said plural information item storing means and with said identifying information, and for determining whether or not said designating information matches any of said specifying information items respectively stored in said effective regions and said identifying information.

105. The data driven information processor according to claim 104, wherein said sequentially comparing and determining means includes second precomparing means, responsive to reception of said ordinary data packet received from any of said receiving ports, for sequentially comparing said designating information of the received ordinary data packet respectively with said specifying information items respectively stored in effective regions of the number specified by said information on the number set in said number information region among said plurality of regions of said plural information item storing means, for rewriting said designating information of the received ordinary data packet to a content of said identifying information to output the received ordinary data packet in response to matching of comparison between said designating information and at least one of said specifying information items, and for directly outputting the received ordinary data packet in response to mismatching of comparison between said designating information and all of said specifying information items for directly outputting the received ordinary data packet, and second main comparing means responsive to reception of said received ordinary data packet output from said second precomparing means, for comparing said designating information of the received ordinary data packet and said identifying information to carry out said determining according to the comparison result.

106. The data driven information processor according to claim 105, wherein said second precomparing means includes rewriting means responsive to said mismatching of comparison for rewriting said designating information of said received ordinary data packet to a content of said identifying information.

107. The data driven information processor according to claim 103, wherein said comparing and determining means includes first precomparing means, responsive to reception of said ordinary data packet received from any of said receiving ports, for sequentially comparing said designating information of the received ordinary data packet respectively with said plurality of specifying information items stored in said plural information item storing means, for outputting the received ordinary data packet in response to matching of comparison between said designating information and at least any one of said plurality of specifying information items for rewriting said designating information of the received ordinary data packet to a content of said identifying information, and for directly outputting the received data packet in response to mismatching of comparison between said designating information and all of said plurality of specifying information items, and first main comparing means, responsive to reception of said received ordinary data packet output from said first precomparing means, for comparing said designating information of the received ordinary data packet and said identifying information to carry out said determining based on the comparison result.

108. The data driven information processor according to claim 107, wherein said first precomparing means includes rewriting means responsive to said matching of comparison for rewriting said designating information of said received ordinary data packet to a content of said identifying information.

109. A data driven processor to be interconnected with a plurality of data driven information processors to receive a data packet and to carry out-processing simultaneously, the data driven information processor comprising:

a plurality of receiving ports each for receiving a data packet from outside the data driven processor;

a specifying information memory for storing one or more specifying information items, included in a specifying data packet received from any of said receiving ports, said specifying information items specifying a predetermined processor among said plurality of data driven information processors;

a comparator comparing designating information designating a processor included in an ordinary data packet received from any of said receiving ports respectively with said one or more specifying information items stored in said specifying information memory means and with identifying information assigned to each processor in advance to identify itself; and an output selector delivering the ordinary data packet to a processing portion of the data driven information processor in response to the comparing indicating a match between at least one of any one of said one or more specifying information items and said identifying information, and said designating information, and sending the received ordinary data packet outside the data driven information processor in response to the comparing indicating mismatching between all of said one or more specifying information items and said identifying information, and said designating information.

110. A method for routing data in a data driven processor to be interconnected with a plurality of data driven information processors to receive a data packet and to carry out-processing simultaneously, the routing comprising:

receiving a data packet from outside the data driven processor at a plurality of receiving ports;

storing one or more specifying information items, included in a specifying data packet received from any of said receiving ports, said specifying information items specifying a predetermined processor among said plurality of data driven information processors;

comparing designating information designating a processor included in an ordinary data packet received from any of said receiving ports respectively with said one or more specifying information items stored in said specifying information memory means and with identifying information assigned to each processor in advance to identify itself;

delivering the ordinary data packet to a processing portion of the data driven information processor in response to the comparing indicating a match between at least one of any one of said one or more specifying information items and said identifying information, and said designating information; and sending the received ordinary data packet outside the data driven information processor in response to the comparing indicating mismatching between all of said one or more specifying information items and said identifying information, and said designating information.

* * * * *